(12) United States Patent
Misaki

(10) Patent No.: US 11,994,397 B2
(45) Date of Patent: May 28, 2024

(54) SHOVEL AND ASSIST DEVICE FOR SHOVEL

(71) Applicant: SUMITOMO CONSTRUCTION MACHINERY CO., LTD., Tokyo (JP)

(72) Inventor: Youji Misaki, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 606 days.

(21) Appl. No.: 16/782,421

(22) Filed: Feb. 5, 2020

(65) Prior Publication Data

US 2020/0173791 A1    Jun. 4, 2020

Related U.S. Application Data

(63) Continuation of application No. PCT/JP2018/029782, filed on Aug. 8, 2018.

(30) Foreign Application Priority Data

Aug. 8, 2017   (JP) .................................. 2017-153671

(51) Int. Cl.
```
G01C 21/34    (2006.01)
E02F 3/32     (2006.01)
E02F 9/26     (2006.01)
G01C 21/36    (2006.01)
G05D 1/00     (2006.01)
G06Q 10/08    (2023.01)
```
(52) U.S. Cl.
CPC .............. *G01C 21/343* (2013.01); *E02F 3/32* (2013.01); *E02F 9/261* (2013.01); *E02F 9/264* (2013.01); *G01C 21/3438* (2013.01); *G01C 21/367* (2013.01); *G06Q 10/08* (2013.01); *G05D 1/0287* (2013.01)

(58) Field of Classification Search
CPC .............. G01C 21/343; G01C 21/3438; G01C 21/367; E02F 3/32; E02F 9/261; E02F 9/264; G06Q 50/28; G06Q 50/08; G05D 1/0287

See application file for complete search history.

(56) References Cited

U.S. PATENT DOCUMENTS

| | | | |
|---|---|---|---|
| 2008/0059005 A1 | 3/2008 | Greiner et al. | |
| 2009/0088961 A1 | 4/2009 | Morey et al. | |
| 2014/0088820 A1* | 3/2014 | Jericho | G07C 5/0825 |
| | | | 701/465 |

(Continued)

FOREIGN PATENT DOCUMENTS

| | | |
|---|---|---|
| JP | S59-38576 U | 3/1984 |
| JP | 2002-105989 | 4/2002 |

(Continued)

OTHER PUBLICATIONS

International Search Report for PCT/JP2018/029782 dated Oct. 23, 2018.

*Primary Examiner* — Ig T An
(74) *Attorney, Agent, or Firm* — IPUSA, PLLC

(57) ABSTRACT

A shovel includes a lower traveling body, an upper turning body turnably mounted on the lower traveling body, an attachment attached to the upper turning body and configured to load a transporter vehicle with an object, and a display device configured to display remaining time calculated on a transporter vehicle basis.

20 Claims, 14 Drawing Sheets

(56) References Cited

U.S. PATENT DOCUMENTS

| | | | | |
|---|---|---|---|---|
| 2014/0231153 A1* | 8/2014 | Fukasu | ................ | E02F 9/2029 |
| | | | | 177/25.13 |
| 2015/0246613 A1 | 9/2015 | Shimazu et al. | | |
| 2015/0269685 A1* | 9/2015 | Takeda | ................ | E02F 9/2054 |
| | | | | 705/7.22 |
| 2017/0200306 A1* | 7/2017 | Marsolek | ................ | G06T 17/05 |
| 2021/0110488 A1* | 4/2021 | Onishi | ................ | E02F 9/2054 |

FOREIGN PATENT DOCUMENTS

| | | |
|---|---|---|
| JP | 2006-022563 | 1/2006 |
| JP | 2013-221309 | 10/2013 |
| JP | 2014-049082 | 3/2014 |
| JP | 2015-209690 | 11/2015 |
| JP | 2015-535992 | 12/2015 |
| JP | 2016-084633 | 5/2016 |
| JP | 2017-071991 | 4/2017 |
| WO | 2015/025537 | 2/2015 |

* cited by examiner

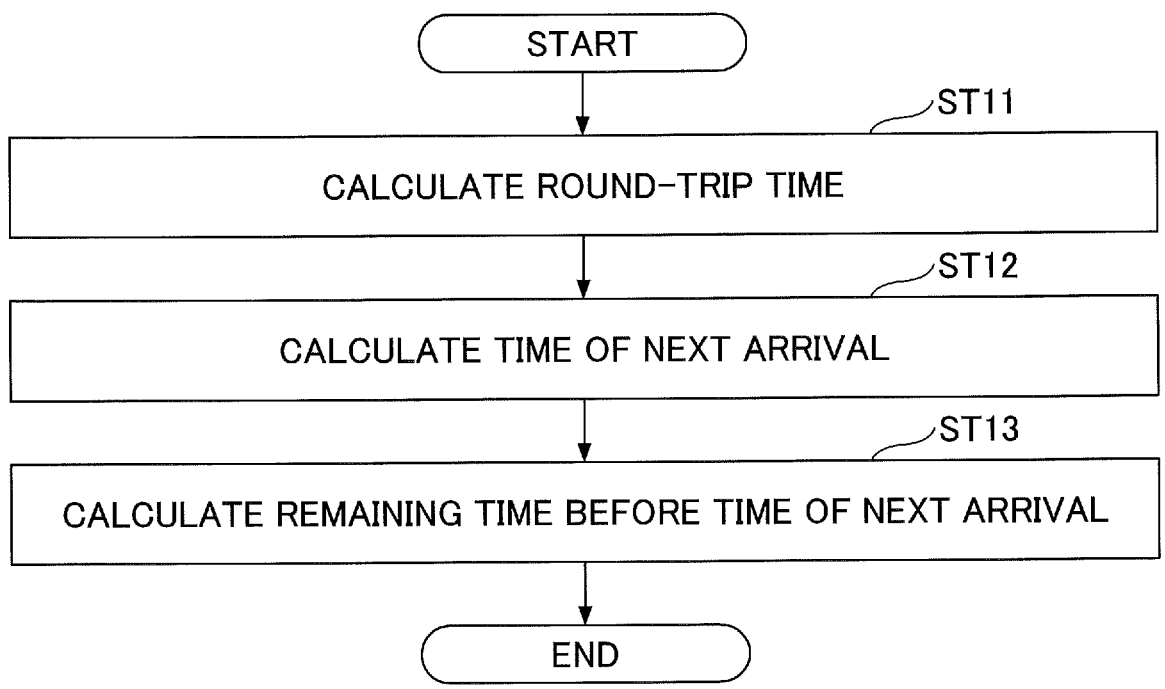

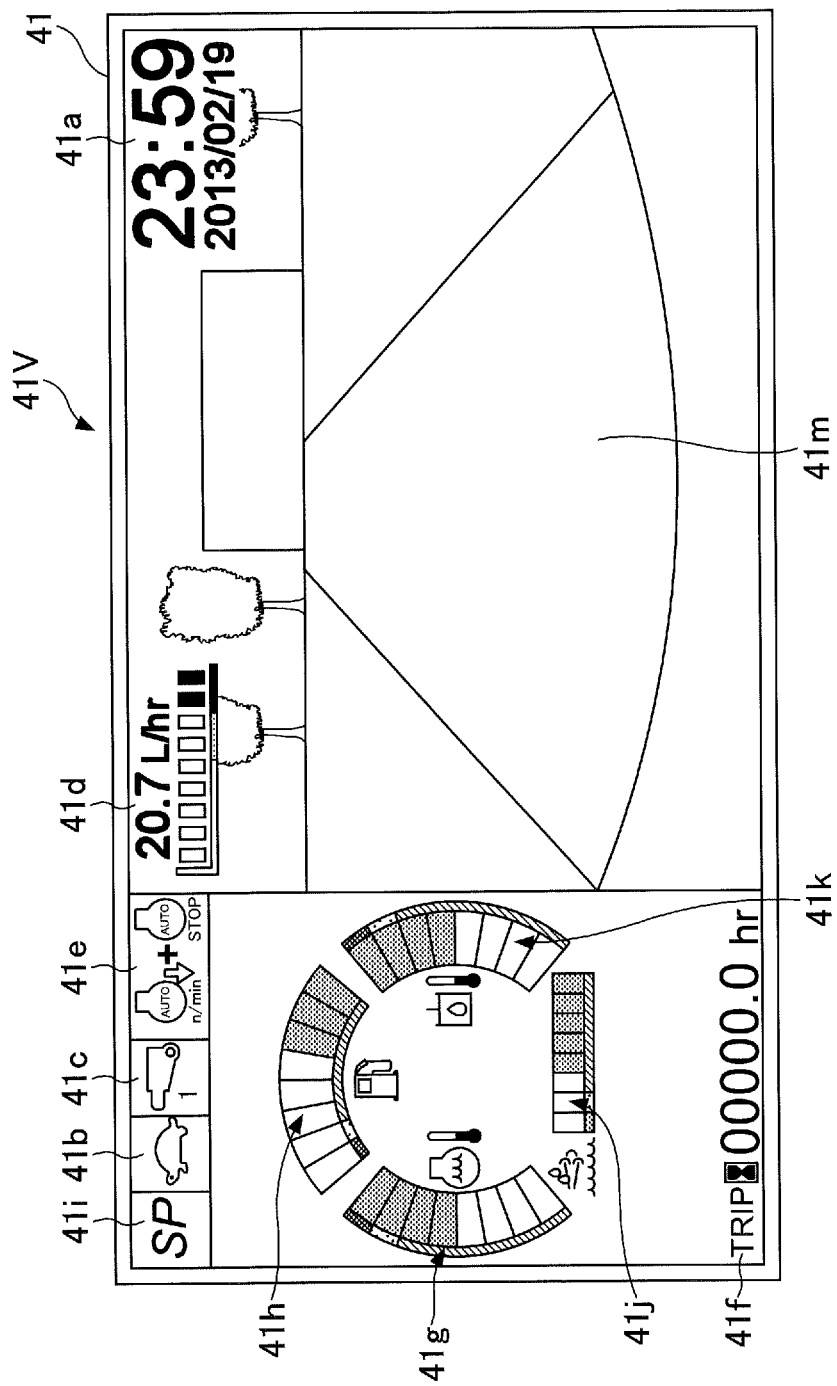

SHOVEL AND ASSIST DEVICE FOR SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/029782, filed on Aug. 8, 2018 and designating the U.S., which claims priority to Japanese patent application No. 2017-153671, filed on Aug. 8, 2017. The entire contents of the foregoing applications are incorporated herein by reference.

BACKGROUND

Technical Field

The present disclosure relates to shovels and assist devices for shovels.

Description of Related Art

An operation management system that makes it possible to share information on vehicles in operation in a mine without increasing communication costs even in an environment where it is difficult to transmit or receive information through radio communications is known.

SUMMARY

According to an aspect of the present invention, a shovel includes a lower traveling body, an upper turning body turnably mounted on the lower traveling body, an attachment attached to the upper turning body and configured to load a transporter vehicle with an object, and a display device configured to display remaining time calculated on a transporter vehicle basis.

BRIEF DESCRIPTION OF THE DRAWINGS

FIG. 4 is a flowchart of a dumper information calculating process;

FIG. 5A is a display example of a main screen;

DETAILED DESCRIPTION

The above-described operation management system, however, only makes it possible to share information on vehicles specifically for a mine belonging to a particular group, and lacks versatility. Therefore, the above-described operation management system is not suitable for an environment where vehicles coming in and out differ from work site to work site or from workday to workday.

In view of the above, it is desired to provide a shovel that can more easily communicate information on a vehicle that works together with the shovel to an operator.

According to an aspect of the present invention, a shovel that can more easily communicate information on a vehicle that works together with the shovel to an operator is provided.

Figure 1:
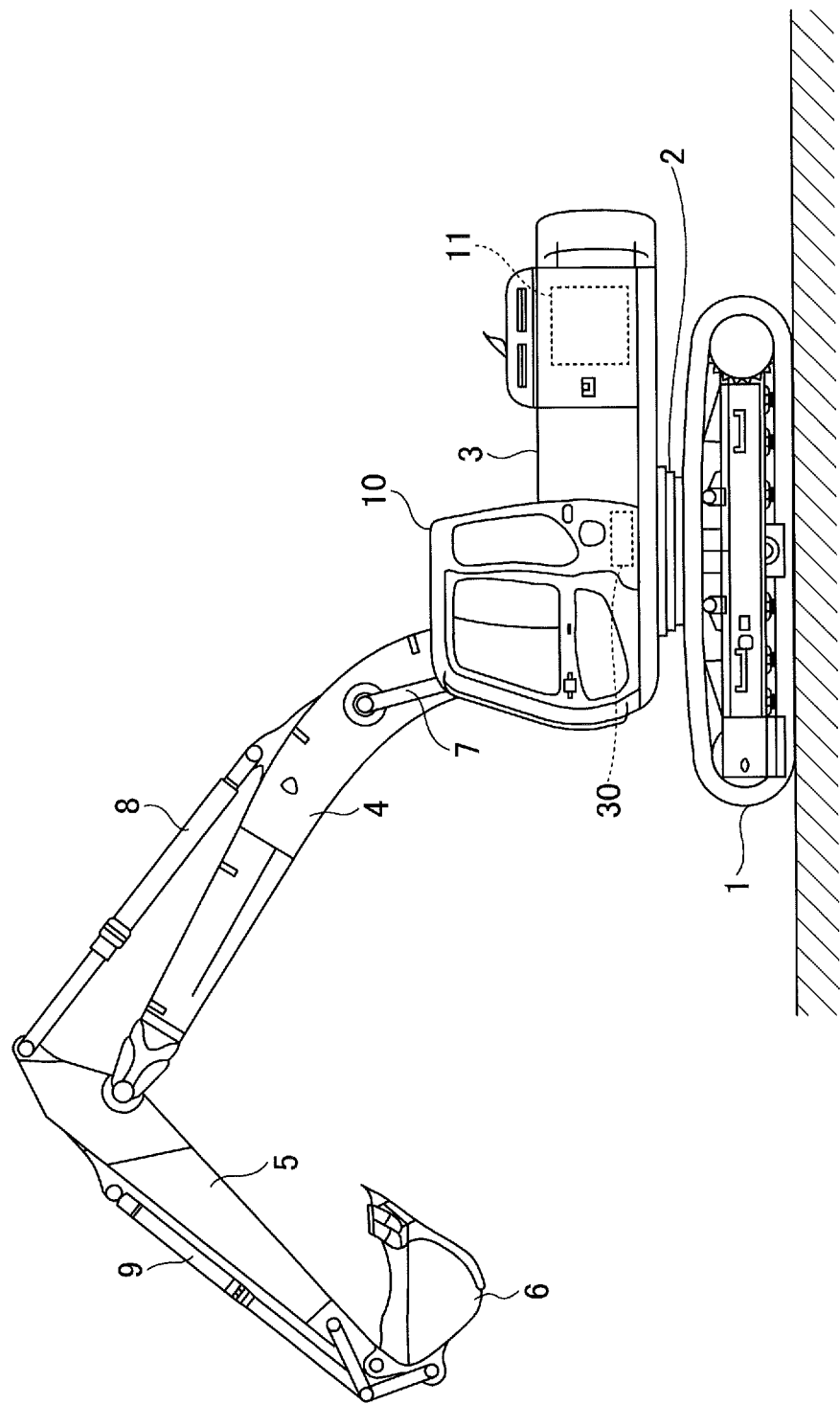
FIG. 1 is a side view of a shovel according to an embodiment of the present invention.

FIG. 1 is a side view illustrating a shovel (excavator) as a construction machine according to an embodiment of the present invention. An upper turning body 3 is turnably mounted on a lower traveling body 1 of the shovel through a turning mechanism 2. A boom 4 is attached to the upper turning body 3. An arm 5 is attached to the end of the boom 4. A bucket 6 is attached to the end of the arm 5. The boom 4, the arm 5, and the bucket 6 serving as work elements constitute an excavation attachment that is an example of an attachment, and are hydraulically driven by a boom cylinder 7, an arm cylinder 8, and a bucket cylinder 9, respectively. A cab 10 is provided on and a power source such as an engine 11 is mounted on the upper turning body 3. A controller 30, etc., are installed in the cab 10. The controller 30 is a control device that controls the operation of the entire shovel. According to this embodiment, the controller 30 is a microcomputer that includes a CPU, a volatile storage device, a non-volatile storage device, and a clock function.

Figure 2:
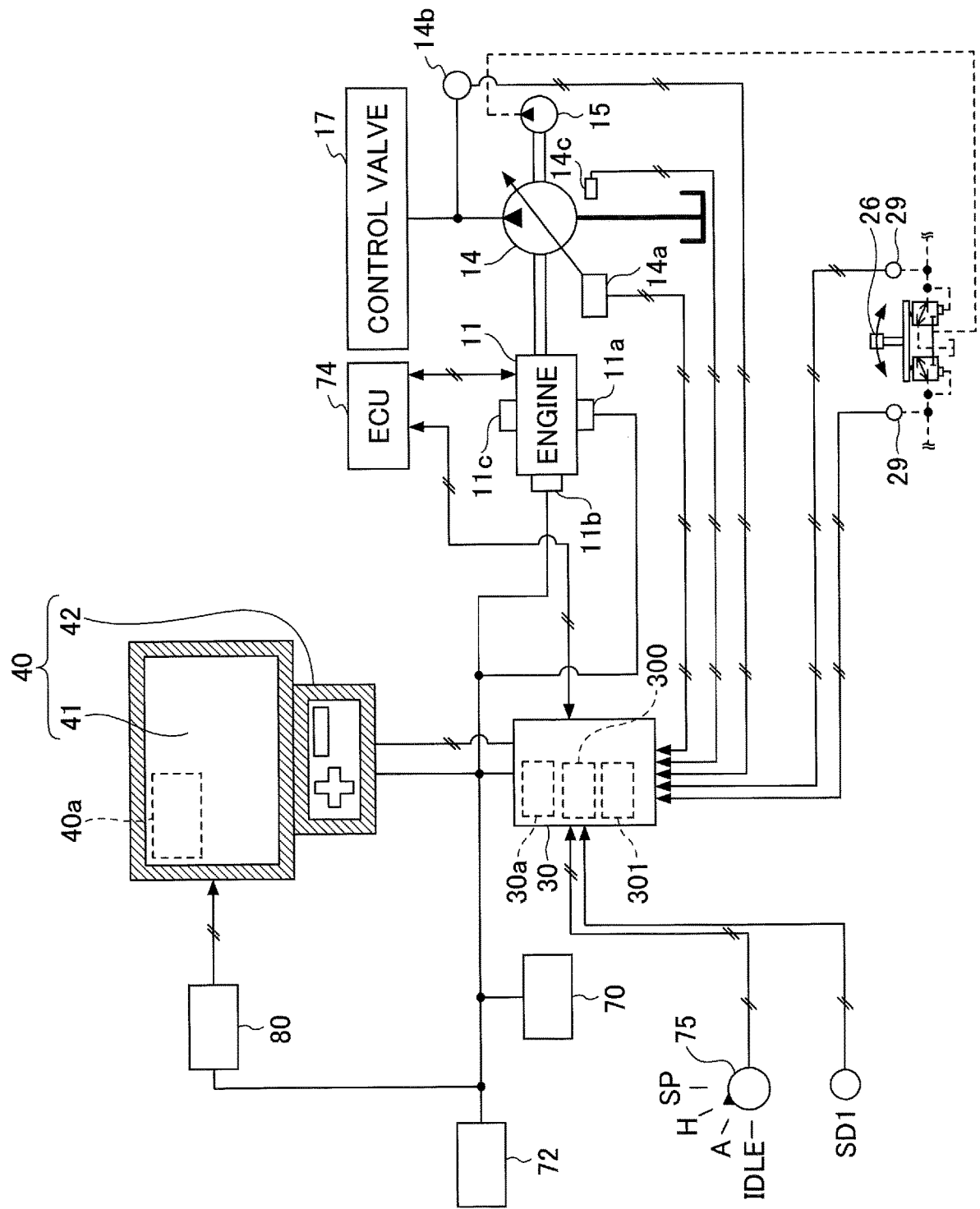
FIG. 2 is a diagram illustrating an example configuration of a basic system installed in the shovel of FIG. 1.

FIG. 2 is a diagram illustrating an example configuration of a basic system installed in the shovel of FIG. 1. The basic system includes the controller 30 and a display device 40.

The display device 40 displays an image including work information supplied from the controller 30. The display device 40 is connected to the controller 30 via, for example, a communications network such as a CAN or a LIN, or a dedicated line.

According to this embodiment, the display device 40 includes a conversion part 40a that generates an image to be displayed on an image display part 41. The conversion part 40a generates an image to be displayed on the image display part 41 based on, for example, image data obtained from an image capturing device 80. The image capturing device 80 includes, for example, a front camera, a left camera, a right camera, and a back camera. According to this embodiment, the front camera is attached to the ceiling of the cab 10, that is, inside the cab 10. The front camera, however, may alternatively be attached to the roof of the cab 10, that is, outside the cab 10, or be attached to the arm 5. The left camera is attached to the left end of the upper surface of the upper turning body 3. The right camera is attached to the right end of the upper surface of the upper turning body 3. The back camera is attached to the back end of the upper surface of the upper turning body 3.

The image capturing device 80 may be a fixed-point camera attached to a steel tower, a building or the like installed in a work site or be an external camera attached to an aerial vehicle such as a multicopter or an airship. In this case, the controller 30 obtains an image captured by the fixed-point camera or the external camera via a communications device, for example.

The conversion part 40a may convert data to be displayed on the image display part 41 among various data input from the controller 30 to the display device 40 into an image signal. Examples of data input from the controller 30 to the display device 40 include data indicating the temperature of engine coolant water, data indicating the temperature of hydraulic oil, data indicating the remaining amount of an aqueous urea solution, and data indicating the remaining amount of fuel. The conversion part 40a outputs the image signal to the image display part 41 for display. The conversion part 40a may be provided in not the display device 40 but the controller 30, for example. In this case, the image capturing device 80 is connected to the controller 30.

The display device 40 includes an input device 42. The input device 42 is a device for inputting various kinds of information to the controller 30 by an operator of the shovel. According to this embodiment, the input device 42 is a push button switch provided in a switch panel. The input device 42, however, may alternatively be a membrane switch, a touchscreen, or the like.

The display device 40 is supplied with electric power from a rechargeable battery 70 to operate. The rechargeable battery 70 is charged with electric power generated in an alternator 11a (generator) of the engine 11. The electric power of the rechargeable battery 70 is also supplied to electrical equipment 72. A starter 11b of the engine 11 is driven with electric power from the rechargeable battery 70 to start the engine 11.

The engine 11 is controlled by an engine controller (ECU) 74. The rotating shaft of the engine 11 is connected to the respective rotating shafts of a main pump 14 and a pilot pump 15. The ECU 74 transmits various data indicating the condition of the engine 11 (for example, data indicating coolant water temperature detected with a water temperature sensor 11c) to the controller 30. The controller 30 stores these data in a storage part 30a and transmits the data to the display device 40 on an as-needed basis.

The main pump 14 is a hydraulic pump for supplying hydraulic oil to a control valve 17 via a hydraulic oil line. The main pump 14 is, for example, a swash plate variable displacement hydraulic pump.

The pilot pump 15 is a hydraulic pump for supplying hydraulic oil to various hydraulic control apparatus via a pilot line. The pilot pump 15 is, for example, a fixed displacement hydraulic pump.

The control valve 17 is a hydraulic controller that controls a hydraulic system in the shovel. The control valve 17 selectively supplies hydraulic oil discharged by the main pump 14 to, for example, one or more hydraulic actuators. Examples of hydraulic actuators include the boom cylinder 7, the arm cylinder 8, the bucket cylinder 9, traveling hydraulic motors, and a turning hydraulic motor.

An operating apparatus 26 is an apparatus that the operator uses to operate hydraulic actuators, and is provided in the cab 10. When the operating apparatus 26 is operated, hydraulic oil is supplied from the pilot pump 15 to a pilot port of a corresponding flow control valve. The pilot port is supplied with hydraulic oil of a pressure commensurate with the operation details of the operating apparatus 26. The operation details include, for example, the direction of operation and the amount of operation. An operating pressure sensor 29 detects a pilot pressure generated when the operating apparatus 26 is operated, and transmits data indicating the detected pilot pressure to the controller 30. The controller 30 detects the operation details of the operating apparatus 26 from the pilot pressure detected by the operating pressure sensor 29.

A regulator 14a of the main pump 14 outputs data indicating a swash plate angle to the controller 30. A discharge pressure sensor 14b outputs data indicating the discharge pressure of the main pump 14 to the controller 30. An oil temperature sensor 14c provided in a conduit between a hydraulic oil tank and the main pump 14 outputs data indicating the temperature of hydraulic oil flowing through the conduit to the controller 30. The controller 30 stores the obtained data in the storage part 30a.

An engine rotational speed adjustment dial 75 is provided in the cab 10. The engine rotational speed adjustment dial 75 is a dial for adjusting the rotational speed of the engine 11, and can switch the engine rotational speed in a stepwise manner, for example. According to this embodiment, the engine rotational speed adjustment dial 75 is so configured as to enable the operator to switch the engine rotational speed among the four levels of SP mode, H mode, A mode, and idling mode. The engine rotational speed adjustment dial 75 transmits data indicating the setting of the engine rotational speed to the controller 30. FIG. 2 illustrates that the H mode is selected by the engine rotational speed adjustment dial 75.

The SP mode is a rotational speed mode selected when it is desired to prioritize workload, and uses the highest engine rotational speed. The H mode is a rotational speed mode selected when it is desired to balance workload and fuel efficiency, and uses the second highest engine rotational speed. The A mode is an rotational speed mode selected when it is desired to operate the shovel at low noise while prioritizing fuel efficiency, and uses the third highest engine rotational speed. The idling mode is a rotational speed mode selected when it is desired to idle the engine, and uses the lowest engine rotational speed. The engine 11 is controlled to a constant rotational speed at the engine rotational speed of the rotational speed mode set by the engine rotational speed adjustment dial 75.

An information obtaining device SD1 detects information on the shovel. According to this embodiment, the information obtaining device SD1 includes at least one of a boom angle sensor, an arm angle sensor, a bucket angle sensor, a body tilt sensor, a turning angular velocity sensor, a boom rod pressure sensor, a boom bottom pressure sensor, an arm rod pressure sensor, an arm bottom pressure sensor, a bucket rod pressure sensor, a bucket bottom pressure sensor, a boom cylinder stroke sensor, an arm cylinder stroke sensor, and a bucket cylinder stroke sensor. The boom angle sensor, the arm angle sensor, and the bucket angle sensor may be composed of a combination of an acceleration sensor and a gyro sensor. The information obtaining device SD1 obtains, as information on the shovel, at least one of a boom angle, an arm angle, a bucket angle, a body inclination angle, a turning angular velocity, a boom rod pressure, a boom bottom pressure, an arm rod pressure, an arm bottom pressure, a bucket rod pressure, a bucket bottom pressure, a boom stroke amount, an arm stroke amount, and a bucket stroke amount, for example.

The controller 30 obtains the output of at least one of the discharge pressure sensor 14b, the operating pressure sensor 29, the image capturing device 80, the information obtaining device SD1, etc., and executes computation with various functional elements. The various functional elements include a detecting part 300 and an estimating part 301. The various functional elements may be configured of either software or hardware. The controller 30 outputs the computation results to the display device 40, etc.

The detecting part 300 is a functional element to detect the occurrence of a predetermined condition. According to this embodiment, the detecting part 300 detects the arrival of a dump truck (hereinafter, "dumper") serving as a transporter vehicle at a loading position and the departure of the dumper from the loading position. When the dumper is at the loading position, the shovel can load an object such as soil into the bed of the dumper.

For example, the detecting part 300 detects the arrival of a dumper at a loading position by detecting the start of loading, and detects the departure of the dumper from the loading position by detecting the completion of the loading. The loading is, for example, the work of loading soil or the like into the bed of a dumper using the excavation attachment, and includes one or more basic operations. For example, a basic operation is constituted of a series of operations such as an arm closing operation, a bucket closing operation, a boom raising operation, a forward turning operation, an arm opening operation, a bucket opening operation, a reverse turning operation, and a boom lowering operation.

For example, the detecting part 300 may detect the start of loading in response to detection of the performance of a combination of a boom raising and turning operation and a soil dumping operation based on the output of the operating pressure sensor 29. The boom raising and turning operation may be either a complex operation of simultaneously performing a boom raising operation and a turning operation or a series of operations in which a turning operation (independent operation) is independently performed within a predetermined period of time after a boom raising operation (independent operation). The soil dumping operation is a bucket opening operation (independent operation) or a complex operation including a bucket opening operation.

The detecting part 300 may detect the completion of loading in response to the period of absence of the performance of a combination of a boom raising and turning operation and a soil dumping operation exceeding a predetermined period of time after detecting the start of the loading. In this case, the time of the latest performance of a combination of a boom raising and turning operation and a soil dumping operation may be specified as the time of the completion of the loading. Furthermore, the detecting part 300 may detect the completion of loading only when the basic operation has been performed a predetermined number of times after the start of the loading.

The detecting part 300 may detect the occurrence of a predetermined condition from the output image of the image capturing device 80. For example, the detecting part 300 may detect the arrival of a dumper at a loading position in response to detection of the approach of the dumper using image recognition. The detecting part 300 may detect the start of loading in response to detection of the bucket 6 positioned above the bed of a dumper using image recognition. The detecting part 300 may detect the departure of a dumper from a loading position in response to detection of the moving away of the dumper using image recognition.

The detecting part 300 may detect the occurrence of a predetermined condition from the output of an environment recognition device such as a lidar device attached to the shovel, the same as in the case of detecting the occurrence of a predetermined condition from the output image of the image capturing device 80.

The detecting part 300 may detect the occurrence of a predetermined condition based on the output of at least one of the boom angle sensor, the arm angle sensor, the bucket angle sensor, the body tilt sensor, etc. For example, the detecting part 300 may detect the start of loading (the arrival of a dumper) in response to detection of a predetermined posture of the upper turning body 3. The detecting part 300 may detect the completion of loading (the departure of a dumper) in response to the period of absence of the detection of the predetermined posture exceeding a predetermined period of time after detecting the start of the loading. In this case, the time of the latest detection of the predetermined posture may be specified as the time of the completion of the loading.

The detecting part 300 may detect the occurrence of a predetermined condition based on the position information of the shovel and the position information of a dumper. For example, the detecting part 300 receives position information output by a positioning device installed in a dumper and compares the position information with position information output by a positioning device installed in the shovel. The detecting part 300 may detect the arrival of the dumper when the dumper approaches within a predetermined distance range around the shovel. Furthermore, the detecting part 300 may detect the departure of the dumper when the dumper moves away out of the predetermined distance range after detection of the arrival of the dumper. Examples of positioning devices include a GNSS receiver.

The detecting part 300 may detect the occurrence of a predetermined condition based on the output of a switch manually operated by the operator of the shovel or manually operated by a driver of a dumper. For example, the detecting part 300 may detect the arrival of a dumper in response to the reception of an arrival signal transmitted by the dumper. The detecting part 300 may detect the departure of a dumper in response to the reception of a departure signal transmitted by the dumper. The same is the case with the switch manually operated by the operator of the shovel.

The detecting part 300 may detect the occurrence of a predetermined condition by combining at least two of the above-described detection methods.

The estimating part 301 is a functional element to estimate information on a vehicle that works together with the shovel. According to this embodiment, the estimating part 301 estimates information on a dumper serving as a vehicle that works together with the shovel. Examples of information on a dumper include a round-trip time to and from a soil dumping ground, an arrival time, and remaining time. The round-trip time to and from a soil dumping ground (hereinafter, "round-trip time") is, for example, the time required for a dumper loaded with soil to travel from a loading position to a soil dumping ground, dump the soil in the soil dumping ground, and return to the loading position. The arrival time is, for example, the time of the arrival of a dumper available for loading soil at a loading position. The remaining time is time before a dumper arrives at a loading position.

For example, the estimating part 301 may use, as an estimate of the future round-trip time (projected time) of a single dumper, an actually measured time from the time of the completion of loading for the single dumper (the time of the departure of the dumper from a loading position) to the time of the start of the next loading for the single dumper (the time of the arrival of the dumper at the loading position). The time of the completion of loading (the time of the departure of the dumper from the loading position) is, for example, the time of detection of the completion of loading by the detecting part 300. The time of the start of loading (the time of the arrival of the dumper at the loading position) is, for example, the time of detection of the start of loading by the detecting part 300.

The estimating part 301 may estimate, based on the round-trip time (projected time) of each of one or more dumpers and the departure time of each dumper, an arrival time that is a time at which each dumper returns to a loading position. The departure time is, for example, a time at which a dumper loaded with soil departs for a soil dumping ground from a loading position (a time at which the detecting part 300 detects the completion of loading).

The estimating part 301 may display estimated information on the image display part 41 of the display device 40. According to this embodiment, when the remaining time before the arrival time becomes shorter than a predetermined time, the estimating part 301 displays the remaining time as a pop-up. In this case, the estimating part 301 may cause audio to be output from an audio output device such as a loudspeaker or a buzzer installed in the cab 10 in order to ensure that the operator is notified of the remaining time.

Figure 3:
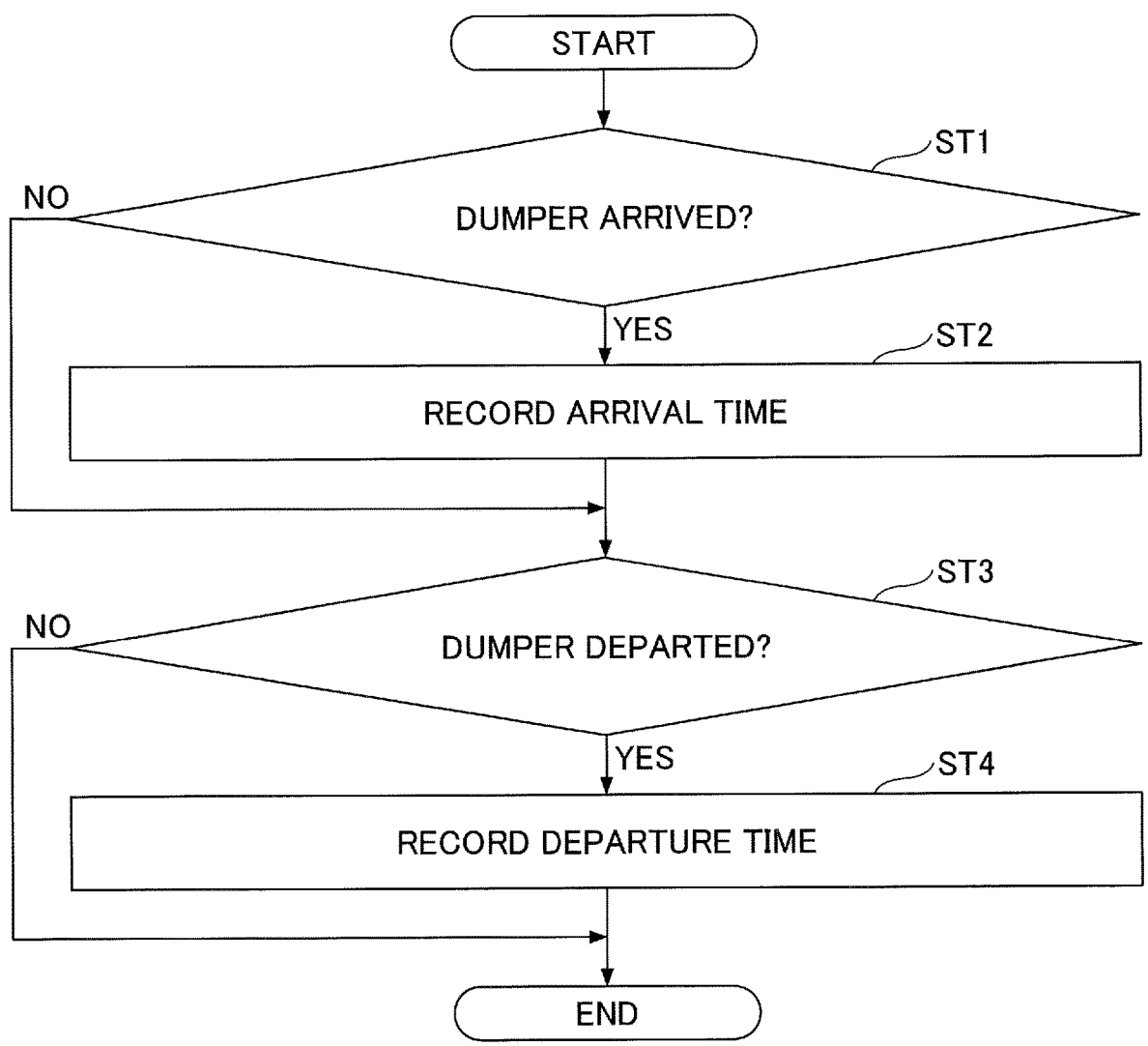
FIG. 3 is a flowchart of a time recording process.

Next, a process of the controller 30 recording various kinds of time (hereinafter, "time recording process") is described with reference to FIG. 3. FIG. 3 is a flowchart illustrating an example of the time recording process. According to this embodiment, the controller 30 repeatedly executes this time recording process at predetermined control intervals while the shovel is in operation.

First, the controller 30 determines whether a dumper has arrived (step ST1). According to this embodiment, the controller 30 determines that a dumper has arrived in response to the detecting part 300 detecting the start of loading. For example, the controller 30 determines that a dumper has arrived in response to the detecting part 300 detecting the performance of a combination of a boom raising and turning operation and a soil dumping operation, namely, the start of loading, based on the output of the operating pressure sensor 29.

In response to determining that a dumper has arrived (YES at step ST1), the controller 30 records the arrival time (step ST2). According to this embodiment, the controller 30 records a time at which the detecting part 300 detects the start of loading (a loading start time) as the arrival time. The arrival time may be a time calculated from the loading start time, such as a time obtained by subtracting a predetermined time from the loading start time.

In response to determining that a dumper has arrived (in response to determining that loading has started), the controller 30 may set a loading flag indicating that loading is in progress to ON. The loading flag may be kept ON until it is determined that loading is completed. When the loading flag is set to ON, the controller 30 may omit step ST1 and step ST2.

In response to determining that a dumper has not arrived (NO at step ST1), the controller 30 executes step ST3 without recording the arrival time.

Thereafter, the controller 30 determines whether the dumper has departed (step ST3). According to this embodiment, in response to the detecting part 300 determining that loading is completed, the controller 30 determines that the dumper has departed. For example, the detecting part 300 detects the departure of a dumper (the completion of loading) in response to the period of absence of the performance of a combination of a boom raising and turning operation and a soil dumping operation exceeding a predetermined period of time after detecting the arrival of the dumper (the start of the loading).

In response to determining that the dumper has departed (YES at step ST3), the controller 30 records the departure time (step ST4). According to this embodiment, the controller 30 records a time at which the detecting part 300 detects the completion of the loading (a loading completion time) as the departure time. The departure time may be a time calculated from the loading completion time, such as a time obtained by adding a predetermined time to the loading completion time. The controller 30 may record the time of the latest performance of a combination of a boom raising and turning operation and a soil dumping operation as the departure time. In this case, every time a combination of a boom raising and turning operation and a soil dumping operation is performed, the controller 30 records a time at which the soil dumping operation is performed as a possible departure time.

In response to determining that the dumper has departed, that is, in response to determining that the loading is completed, the controller 30 may set the loading flag to OFF. When the loading flag is set to OFF, the controller 30 may omit step ST3 and step ST4.

In response to determining that the dumper has not departed (NO at step ST3), the controller 30 ends the time recording process of this time without recording the departure time.

Thus, by recording the loading start time, the controller 30 can roughly record the arrival time. Furthermore, by recording the loading completion time, the controller 30 can roughly record the departure time.

Next, a process of the controller 30 calculating information on a dumper that works together with the shovel (hereinafter, "dumper information calculating process") is described with reference to FIG. 4. FIG. 4 is a flowchart illustrating an operation of the dumper information calculating process. According to this embodiment, the controller 30 repeatedly executes this dumper information calculating process at predetermined control intervals while the shovel is in operation. The controller 30 may execute this dumper information calculating process every time loading is started.

First, the controller 30 calculates the round-trip time (step ST11). According to this embodiment, the estimating part 301 of the controller 30 calculates the time from the time of the completion of the first round of loading for a particular single dumper to the time of the start of the second round of loading for the single dumper as a first round-trip time (actually measured time). The estimating part 301 estimates the second round-trip time (projected time) of the single dumper based on the first round-trip time (actually measured time). That is, the estimating part 301 estimates the second round-trip time (projected time), which is the time from the time of the completion of the second round of loading to the time of the start of the third round of loading. The first round-trip time (actually measured time) may be directly employed as the second round-trip time (projected time). According to this embodiment, the second round-trip time (projected time) is not estimated before the round-trip time (actually measured time) is obtained. The second round-trip time (projected time), however, may be estimated based on the first round-trip time (projected time) calculated based on the distance from a loading position to a soil dumping ground or the like.

A third round-trip time (projected time) from the time of the completion of the third round of loading to the time of the start of the fourth round of loading may be, for example, the mean of the first round-trip time (actually measured) and the second round-trip time (actually measured). The same is the case with a fourth round-trip time (projected time), a fifth round-trip time (projected time), a sixth round-trip time (projected time), etc. Instead of a mean, other statistical values such as a maximum, a minimum, a mid-range, and a median may be employed.

When multiple dumpers work together with the shovel, the controller 30 calculates or estimates the round-trip time for each dumper. In this case, the controller 30 may urge the operator to input the number of dumpers that work together with the shovel. For example, the controller 30 may cause an input screen that urges the operator to input the number of dumpers to be displayed at the start of the shovel. The controller 30 may distinguish among multiple dumpers by recognizing the characters of a license plate appearing in the output image of the image capturing device 80 through image recognition.

For example, when the number of dumpers (for example, "four") is input, the controller 30 may determine that a dumper associated with the $(4n+1)^{th}$ (where n is an integer greater than one), for example, fifth, ninth, $13^{th}$, etc., round of loading is the dumper (first dumper) associated with the first round of loading. In this case, the controller 30 calculates the time from the time of the completion of the first round of loading to the time of the start of the fifth round of loading as the first round-trip time (actually measured time) of the first dumper. Then, based on the first round-trip time (actually measured time) of the first dumper, the controller 30 estimates the second round-trip time (projected time) of the first dumper, namely, the time from the time of the completion of the fifth round of loading to the time of the start of the ninth round of loading. The first round-trip time (actually measured time) may be directly employed as the second round-trip time (projected time).

Likewise, the controller 30 may determine that a dumper associated with the $(4n+2)^{th}$, for example, sixth, tenth, $14^{th}$, etc., round of loading is the dumper (second dumper) associated with the second round of loading. In this case, the controller 30 calculates the time from the time of the completion of the second round of loading to the time of the start of the sixth round of loading as the first round-trip time (actually measured time) of the second dumper. Then, based on the first round-trip time (actually measured time) of the second dumper, the controller 30 estimates the second round-trip time (projected time) of the second dumper, namely, the time from the time of the completion of the sixth round of loading to the time of the start of the tenth round of loading.

In the case where no number of dumpers is input, the controller 30 may estimate the number of dumpers when a loading interval that is the difference between the loading completion time and the next loading start time exceeds a predetermined period of time. This is based on the assumption that all dumpers are together at a work site when the first round of loading is performed. For example, in the case where four dumpers are together at a work site, four rounds of loading are successively performed before the fourth round of loading is completed. This is because the four dumpers available for loading soil are already waiting. It is not until the fourth round of loading is completed that there is no dumper available for loading soil. This is because the first dumper has not returned to a loading position. In this case, when the fifth round of loading is started, the controller 30 may determine that a loading interval that is the difference between the loading completion time of the fourth round and the loading start time of the fifth round is conspicuously greater than the previous loading intervals, and estimate that the number of dumpers is four. After estimating the number of dumpers, the controller 30 calculates or estimates the round-trip time of each dumper the same as in the case where the number of dumpers is input.

Thereafter, the controller 30 calculates the time of the next arrival (step ST12). According to this embodiment, the controller 30 calculates the time of the next arrival of a dumper to arrive at a loading position next by adding the round-trip time (projected time) to the time of the last departure of the dumper. The time of the last departure is, for example, the time of the completion of the last loading.

Thereafter, the controller 30 calculates the remaining time before the time of the next arrival (step ST13). According to this embodiment, the controller 30 calculates the difference between the time of the next arrival and a current time as the remaining time.

Thus, the controller 30 can determine whether a dumper has arrived at a loading position by determining whether loading is started. Furthermore, the controller 30 can determine whether the dumper has departed from the loading position by determining whether the loading is completed. Then, based on the time from the completion of the loading to the start of the next loading, the controller 30 can determine the round-trip time that the dumper that has departed from the loading position takes before returning to the loading position. Furthermore, the controller 30 can calculate the arrival time and the remaining time from the round-trip time.

Figure 5B:
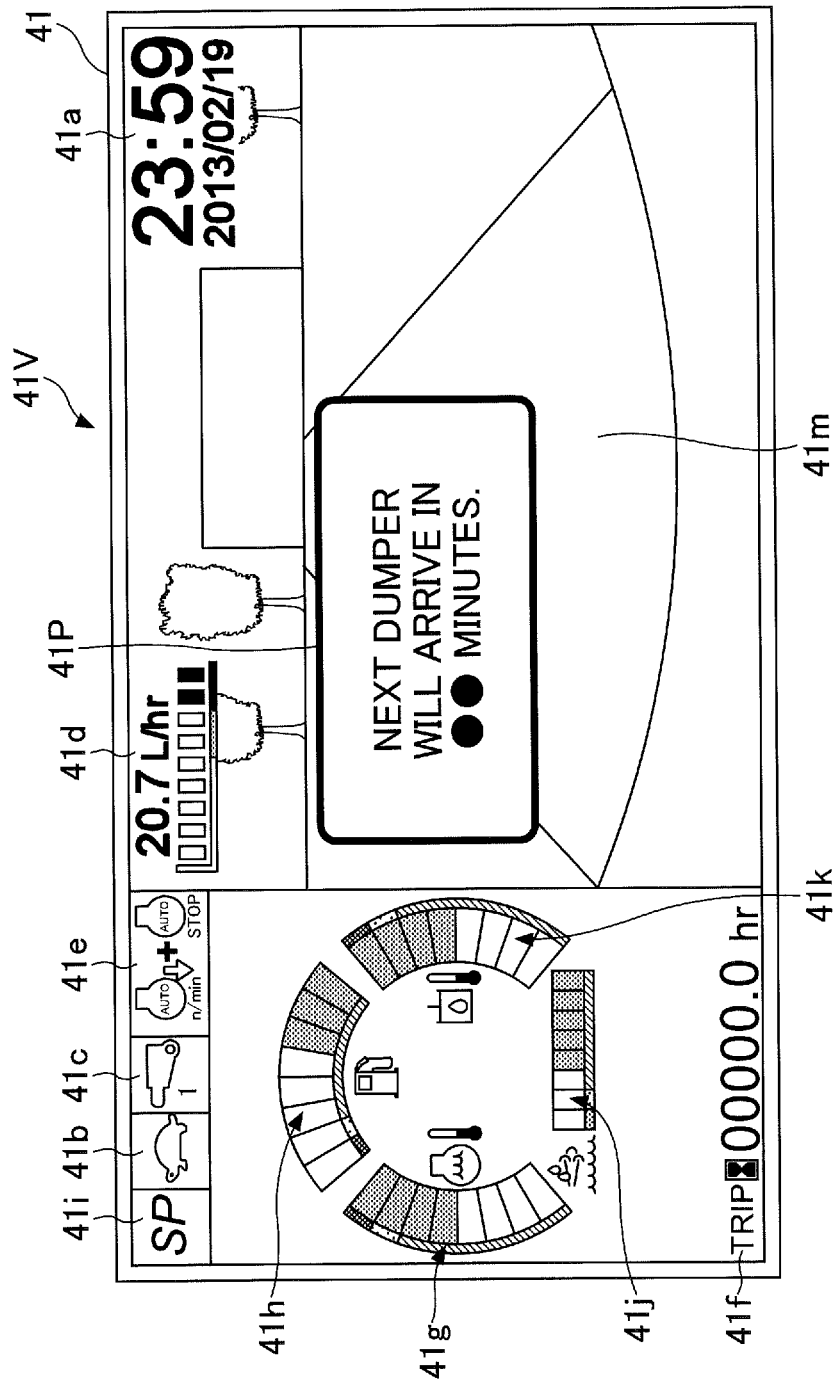
FIG. 5B is another display example of the main screen.

Next, example configurations of a screen displayed on the display device 40 are described with reference to FIGS. 5A and 5B. FIG. 5A illustrates an example of a main screen 41V that is displayed on the image display part 41 of the display device 40. FIG. 5B illustrates an example of the main screen 41V when the remaining time is displayed as a pop-up. At least part of the main screen 41V, however, may be displayed on a monitor different from the display device 40. The different monitor may be, for example, a monitor attached to a portable information terminal such as a smartphone carried by the operator of the shovel or a stationary monitor installed in the cab 10 separately from the display device 40.

The main screen 41V includes a date and time display area 41a, a traveling mode display area 41b, an attachment display area 41c, an average fuel efficiency display area 41d, an engine control status display area 41e, an engine operating time display area 41f, a coolant water temperature display area 41g, a remaining fuel amount display area 41h, a rotational speed mode display area 41i, a remaining aqueous urea solution amount display area 41j, a hydraulic oil temperature display area 41k, and a camera image display area 41m. Each of the traveling mode display area 41b, the attachment display area 41c, the engine control status display area 41e, and the rotational speed mode display area 41i is an example of a settings display part that displays the settings of the shovel. Each of the average fuel efficiency display area 41d, the engine operating time display area 41f, the coolant water temperature display area 41g, the remaining fuel amount display area 41h, the remaining aqueous urea solution amount display area 41j, and the hydraulic oil temperature display area 41k is an example of an operating condition display part that displays the operating condition of the shovel.

The date and time display area 41a is an area for displaying a current date and time. The traveling mode display area 41b is an area for displaying an icon that represents a current traveling mode. The attachment display area 41c is an area for displaying an icon that represents a currently attached attachment. The average fuel efficiency display area 41d is an area for displaying current average fuel efficiency. The engine control status display area 41e is an area for displaying an icon that represents the control status of the engine 11. The coolant water temperature display area 41g is an area for displaying the current temperature condition of engine coolant water. The remaining fuel amount display area 41h is an area for displaying the state of the remaining amount of fuel stored in a fuel tank. The rotational speed mode display area 41i is an area for displaying a current rotational speed mode.

The remaining aqueous urea solution amount display area 41j is an area for displaying the status of the remaining amount of an aqueous urea solution stored in an aqueous urea solution tank. The hydraulic oil temperature display area 41k is an area for displaying the temperature condition of hydraulic oil in a hydraulic oil tank. The camera image display area 41m is an area for displaying a camera image. According to the example of FIG. 5A, the camera image display area 41m displays the output image of the back camera.

As illustrated in FIG. 5B, the controller 30 displays a pop-up window 41P when a predetermined display condition is satisfied. The pop-up window 41P is an image for notifying the operator of the shovel of information on a dumper that works together with the shovel. Thus, the remaining time calculated for each transporter vehicle is displayed on the display device 40. According to the example of FIG. 5B, the pop-up window 41P includes a text message "NEXT DUMPER WILL ARRIVE IN ●● MINUTES" that conveys the remaining time before the next arrival time. Along with displaying the pop-up window 41P as a pop-up or instead of displaying the pop-up window 41P as a pop-up, the controller 30 may output information on the remaining time from a loudspeaker installed in the cab 10 as audio.

Examples of the predetermined condition include that the remaining time is shorter than a predetermined time, that the elapsed time from the latest loading completion time is longer than a predetermined time, and that the operator of the shovel has operated a predetermined switch. For example, when the remaining time, which is the time before the arrival of a dumper at a loading position, becomes a predetermined time, the controller 30 informs the operator to that effect using the pop-up display of the pop-up window 41P, audio output, etc.

Through this display, the controller 30 can inform the operator of the shovel of the remaining time before the arrival of the next dumper (a dumper that immediately follows) at a loading position. By knowing the remaining time, the operator of the shovel can timely perform setup work, etc. The setup work is, for example, preparation work for smooth performance of loading, and includes the work of gathering soil around a loading position, the work of leveling the ground on which a dumper passes or stops.

Figure 6:
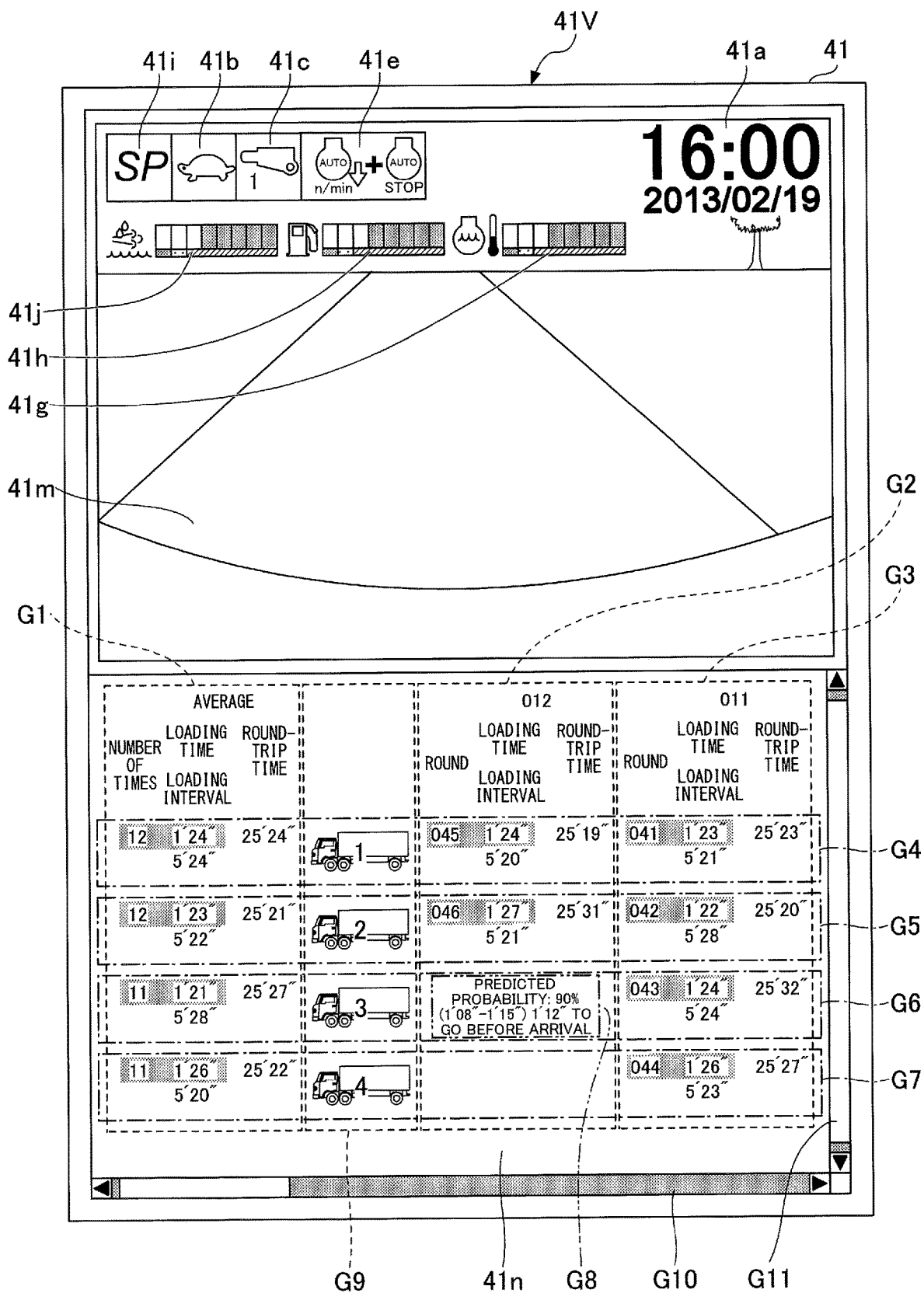
FIG. 6 is yet another display example of the main screen.

Next, another example configuration of the screen displayed on the display device 40 is described with reference to FIG. 6. The screen of FIG. 6 is different from the screen of FIG. 5A in that the traveling mode display area 41b, the attachment display area 41c, the engine control status display area 41e, the coolant water temperature display area 41g, the remaining fuel amount display area 41h, the rotational speed mode display area 41i, and the remaining aqueous urea solution amount display area 41j are displayed over the camera image display area 41m, but is equal to the screen FIG. 5A in what is displayed in each area. Furthermore, the screen of FIG. 6 is different from the screen of FIG. 5A in including a dumper information display area 41n below the camera image display area 41m. Therefore, a description of a common portion is omitted, and differences are described in detail. The dashed line, one-dot chain line, and two-dot chain line in the dumper information display area 41n are for illustrative purposes, and are not actually displayed.

According to the illustration of FIG. 6, the dumper information display area 41n includes a statistics display area G1, a current set display area G2, a last set display area G3, a first dumper display area G4, a second dumper display area G5, a third dumper display area G6, and a fourth dumper display area G7, a remaining time display area G8, a dumper image display area G9, a horizontal scroll bar G10, and a vertical scroll bar G11.

The statistics display area G1 is an area for displaying the statistical values of each dumper. According to the illustration of FIG. 6, the number of times (the total number of times of loading) and the average of each of the loading time, the loading interval, and the round-trip time with respect to each of four dumpers are displayed. Specifically, the statistics display area G1 shows that twelve times of loading is completed and the averages of the loading time, the loading interval, and the round-trip time are "1' 24"," "5' 24"," and "25' 24"," respectively, with respect to the first dumper. The same applies to the second dumper, the third dumper, and the fourth dumper. Here, "'" stands for "minute" and """ stands for "second."

The current set display area G2 is an area for displaying information on a current set. The term "set" means a collection of information on loading of the number of rounds commensurate with the number of dumpers. According to the illustration of FIG. 6, where four dumpers are used, the term "set" means a collection of information on the four rounds of loading. The current set is the 12th set, and corresponds to a collection of information on the 45th round through the 48th round of loading. The current set display area G2 indicates that the 47th round of loading for the third dumper is yet to be started.

The last set display area G3 is an area for displaying information on the last set. For example, the last set display area G3 shows that the loading time, the loading interval, and the round-trip time in the 41st round of loading for the first dumper are "1' 23"," "5' 21"," and "25' 23"," respectively. The dumper information display area 41n, which displays information on the two sets of the current set display area G2 and the last set display area G3 according to the illustration of FIG. 6, may also display information on three or more sets. For example, the dumper information display area 41n may include information on the current set, information on the last set, and information on the last set but one.

At least one of the current set display area G2 and the last set display area G3 may be highlighted so that the operator can distinguish the current set display area G2 and the last set display area G3.

The dumper information display area 41n may include a next set display area (not depicted). The next set display area is an area for displaying information on the next set, and according to the illustration of FIG. 6, corresponds to a collection of information on the 49th round through the 52nd round of loading. The information on the next set includes projected values calculated from information on the past sets. At least one of the current set display area G2, the last set display area G3, and the next set display area may be highlighted so that the operator can distinguish the current set display area G2, the last set display area G3, and the next set display area. Furthermore, the last set display area G3 may be omitted.

The first dumper display area G4 is an area for displaying information on the first dumper. Likewise, the second dumper display area G5 is an area for displaying information on the second dumper, the third dumper display area G6 is an area for displaying information on the third dumper, and the fourth dumper display area G7 is an area for displaying information on the fourth dumper.

The remaining time display area G8 is an area for displaying information on the remaining time. According to the illustration of FIG. 6, the remaining time display area G8 is placed where information on the third dumper is to be displayed in the current set display area G2 in order to correspond to the current state where the arrival of the third dumper is awaited. According to the illustration of FIG. 6, the remaining time display area G8 indicates that there are "1' 12''" to go before the arrival of the third dumper and that the third dumper will arrive, with a predicted probability of 90%, after passage of time that varies within the range of "1' 08" to 1' 15"." The predicted probability is a numerical value that represents how certain the remaining time is, and is calculated based on a predetermined calculation formula. The remaining time is updated with the passage of time. The remaining time is displayed, being counted down by the second, for example.

The remaining time display area G8 may display the remaining time in a negative value such as "–2' 30"." For example, "–2' 30''" represents that 2 minutes and 30 seconds have passed since the arrival of the third dumper at a loading position. Alternatively, "–2' 30''" may represent that the third dumper has not arrived after passage of 2 minutes and 30 seconds since the estimated arrival time.

The dumper information display area 41*n* may display the remaining time with respect to each of the first through fourth dumpers. In this case, the dumper information display area 41*n* may include four remaining time display areas G8 corresponding to the first through fourth dumpers.

The dumper image display area G9 is an area where as many dumper images (computer graphics images) as the number of dumpers in use are displayed. According to the illustration of FIG. 4, four dumper images are displayed.

The horizontal scroll bar G10 indicates the horizontal scroll state of the dumper information display area 41*n*. The vertical scroll bar G11 indicates the vertical scroll state of the dumper information display area 41*n*. The operator can operate the horizontal scroll bar G10 and the vertical scroll bar G11 through a touchscreen serving as the input device 42, for example.

According to this screen configuration, the shovel according to the embodiment of the present invention can more easily impart information on a dumper that is a vehicle that works together with the shovel to the operator. Therefore, the operator of the shovel can easily understand the time before the arrival of the next dumper to a loading position, for example. As a result, the operator can timely perform a setup work. Furthermore, the operator can easily understand the number of rounds of loading that have been completed so far, for example. As a result, the operator can easily understand the amount of work performed by the shovel, the amount of work performed by a dumper, etc. Furthermore, information displayed in the dumper information display area 41*n* may be displayed on a display device outside the shovel by radio communications. The display device outside the shovel includes the monitor of a management apparatus installed in a management center, etc., the monitor of an assist device such as a portable information terminal carried by a worker or the like working around the shovel, and so on. In this case, a manager in the management center, a worker working around the shovel, etc., can easily obtain information on a dumper that works together with the shovel and use the obtained information for management of the dumper.

As described above, the shovel according to the embodiment of the present invention includes the lower traveling body 1, the upper turning body 3 turnably mounted on the lower traveling body 1, the attachment attached to the upper turning body 3 and configured to perform loading of a transporter vehicle with soil, and the display device 40 configured to display the remaining time calculated on a transporter vehicle basis.

The shovel according to the embodiment of the present invention may include the controller 30 serving as a control device configured to estimate time required for the transporter vehicle (dumper) to dump the soil and return (round-trip time) based on the time of the completion of the loading of the dumper with the soil by the attachment and the time of the start of the next loading of the dumper. For example, the controller 30 records the time of the completion of loading (loading completion time) as the time of the departure of the dumper from a loading position (departure time) and records the time of the start of loading (loading start time) as the time of the arrival of the dumper at the loading position (arrival time). The controller 30 calculates the time from the loading completion time to the next loading start time as the round-trip time of the dumper.

The controller 30 may calculate the time from the loading start time to the loading completion time as a loading time from the start of loading to the completion of the loading. Furthermore, the controller 30 may calculate the remaining time before the next loading of the dumper can be performed based on the round-trip time. The controller 30 may calculate the remaining time on a dumper basis. The round-trip time, the loading time, etc., may be recorded and their averages, etc., may be calculated on a dumper basis.

According to this configuration, the shovel according to the embodiment of the present invention can calculate dumper-related information and impart it to the operator even when a positioning device such as a GNSS receiver is not installed in the shovel. Furthermore, the shovel can calculate dumper-related information and impart it to the operator even when a positioning device and a communications device are not installed in a dumper.

Figure 7:
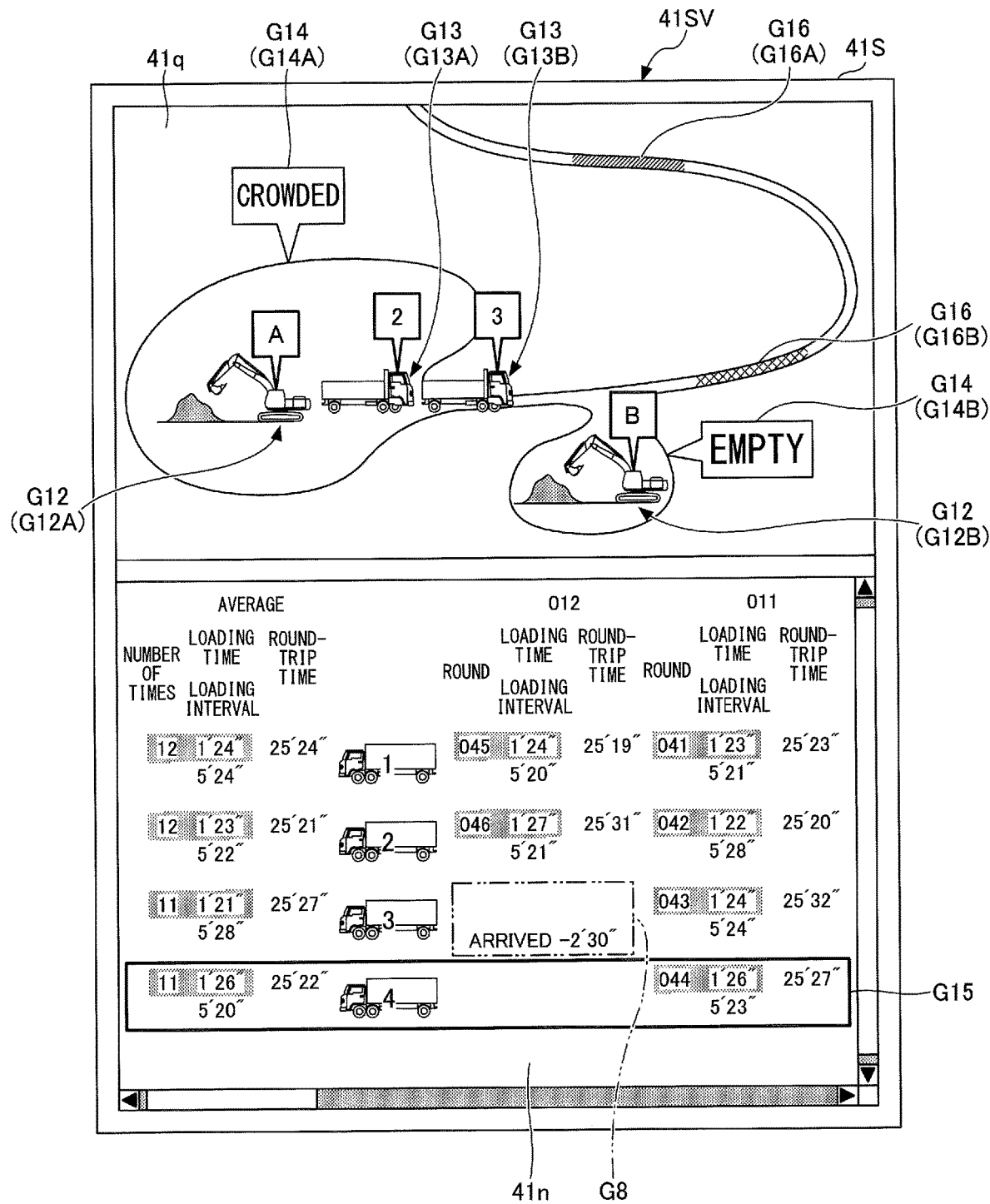
FIG. 7 is still another display example of the main screen.

Next, an example configuration of a screen displayed on a display device included in an assist device in a dumper is described with reference to FIG. 7. FIG. 7 illustrates a main screen 41SV displayed on a display device 41S of an assist device placed near the operator seat of the fourth dumper. Furthermore, FIG. 7 illustrates a situation where two shovels (controllers 30) and four dumpers share information (processing results). The main screen 41V may display a situation where three or more shovels (controllers 30) share information (processing results). The assist device is a device to assist work related to the shovel's loading of soil onto a transporter vehicle. Examples of assist devices include multifunctional portable information terminals such as cellular phones, smartphones, and tablet PCs.

The main screen 41SV of FIG. 7 displays information on the first through fourth dumpers that cooperate with a shovel A working at a first work site (first loading site), and also shows the presence of a shovel B that has actually started working at a second work site (second loading site).

Specifically, the main screen 41SV includes a map information display area 41*q* and the dumper information display area 41*n*.

The map information display area 41*q* is an area for displaying map information. According to the illustration of FIG. 7, a map including the first loading site and the second loading site is displayed. A shovel image G12 displayed over the map information display area 41*q* indicates the position of a shovel working at a loading site. For example, a shovel image G12A indicates the position of the shovel A working at the first loading site, and a shovel image G12B indicates the position of the shovel B that has actually started working at the second loading site. A dumper image G13 displayed over the map information display area 41*q* indicates the position of a dumper that cooperates with a shovel. According to FIG. 7, the dumper image G13 includes a dumper image G13A and a dumper image G13B. For example, the dumper image G13A indicates the position of the second dumper presumed to be loaded with soil by the shovel A, and the dumper image G13B indicates the position of the third dumper presumed to be waiting for the shovel A to start loading soil. A busyness image G14 displayed over the map information display area 41*q* indicates the busyness of each loading site. According to FIG. 7, the busyness image G14 includes a busyness image G14A and a busyness image G14B. For example, the busyness image G14A indicates that the first loading site is busy, and the busyness image G14B indicates that the second loading site is unbusy. Being busy indicates, for example, the presence of a dumper waiting to be loaded by a shovel. Being unbusy indicates, for example, the absence of a dumper waiting to be loaded by a shovel. A congestion image G16 displayed over the map information display area 41*q* indicates congestion on a road on which a dumper travels. According to FIG. 7, the congestion image G16 includes a congestion image G16A and a congestion image G16B. For example, the congestion image G16A is an image indicating a section where an average travel speed is less than or equal to a first threshold, and is highlighted in a first color (for example, yellow). The congestion image G16B is an image indicating a section where an average travel speed is less than or equal to a second threshold smaller than the first threshold, and is highlighted in a second color (for example, red). For example, the controller 30 is configured to display the congestion image G16 based on traffic report such as traffic congestion information. For example, the controller 30 may obtain traffic report such as traffic congestion information by accessing a traffic-related API (Application Programming Interface) correlated with a map published on the external web via a communications device.

The contents of display of the dumper information display area 41*n* are almost the same as the contents of display of the dumper information display area 41*n* illustrated in FIG. 6. The contents of display of the dumper information display area 41*n* illustrated in FIG. 7, however, are different from the contents of display of the dumper information display area 41*n* illustrated in FIG. 6 mainly in including a highlighting image G15 and in that the remaining time in the remaining time display area G8 is a negative value.

The highlighting image G15 is an image that makes it possible to distinguish information on one's vehicle (the fourth dumper) from information on other vehicles (the first through third dumpers). According to the illustration of FIG. 7, the highlighting image G15 is a solid-line black frame surrounding the fourth dumper display area G7 (see FIG. 6). The highlighting image G15 may also be expressed in other display modes such as a dotted-line frame, a red frame, and a green frame. The driver of the fourth dumper can easily specify information on the dumper that she or he drives by looking at the highlighting image G15.

The remaining time "−2' 30'"" displayed in the remaining time display area G8 shows that 2 minutes and 30 seconds have passed since the arrival of the third dumper at the first loading site. In this case, the display of the predicted probability and the variation range is omitted. Furthermore, ARRIVED is displayed instead of BEFORE ARRIVAL in the remaining time display area G8.

The remaining time "−2' 30'"" displayed in the remaining time display area G8 may show that the arrival of the third dumper is delayed and is 2 minutes and 30 seconds behind the estimated arrival time. In this case as well, the display of the predicted probability and the variation range is omitted. Furthermore, text information such as DELAYED is displayed instead of ARRIVED in the remaining time display area G8.

In the case of having identified the degree of delay based on information through a communications device, the controller 30 may display the delay-adjusted remaining time in the remaining time display area G8. Specifically, after re-estimating the arrival time of the third dumper, the controller 30 may calculate the remaining time before the newly estimated arrival time and display the remaining time in the remaining time display area G8.

As described above, the assist device for a shovel that assists work associated with the shovel's loading of a transporter vehicle with soil includes the display device 41S that displays the remaining time calculated for each transporter vehicle. The display device 41S displays, for example, map information and the position information of the shovel. The display device 41S may display map information and the busyness of each loading site.

By looking at the main screen 41SV as described above, a dumper driver can determine a loading position to head for among loading positions for shovels. For example, the driver of the fourth dumper can be aware that the loading of the second dumper is in progress and that the third dumper has arrived at the first loading site but has been waiting for 2 minutes and 30 seconds. The driver of the fourth dumper can also be aware that there is no wait time at the second loading site. Therefore, the driver of the fourth dumper can determine that it is more efficient to head for the second loading site.

Figure 8:
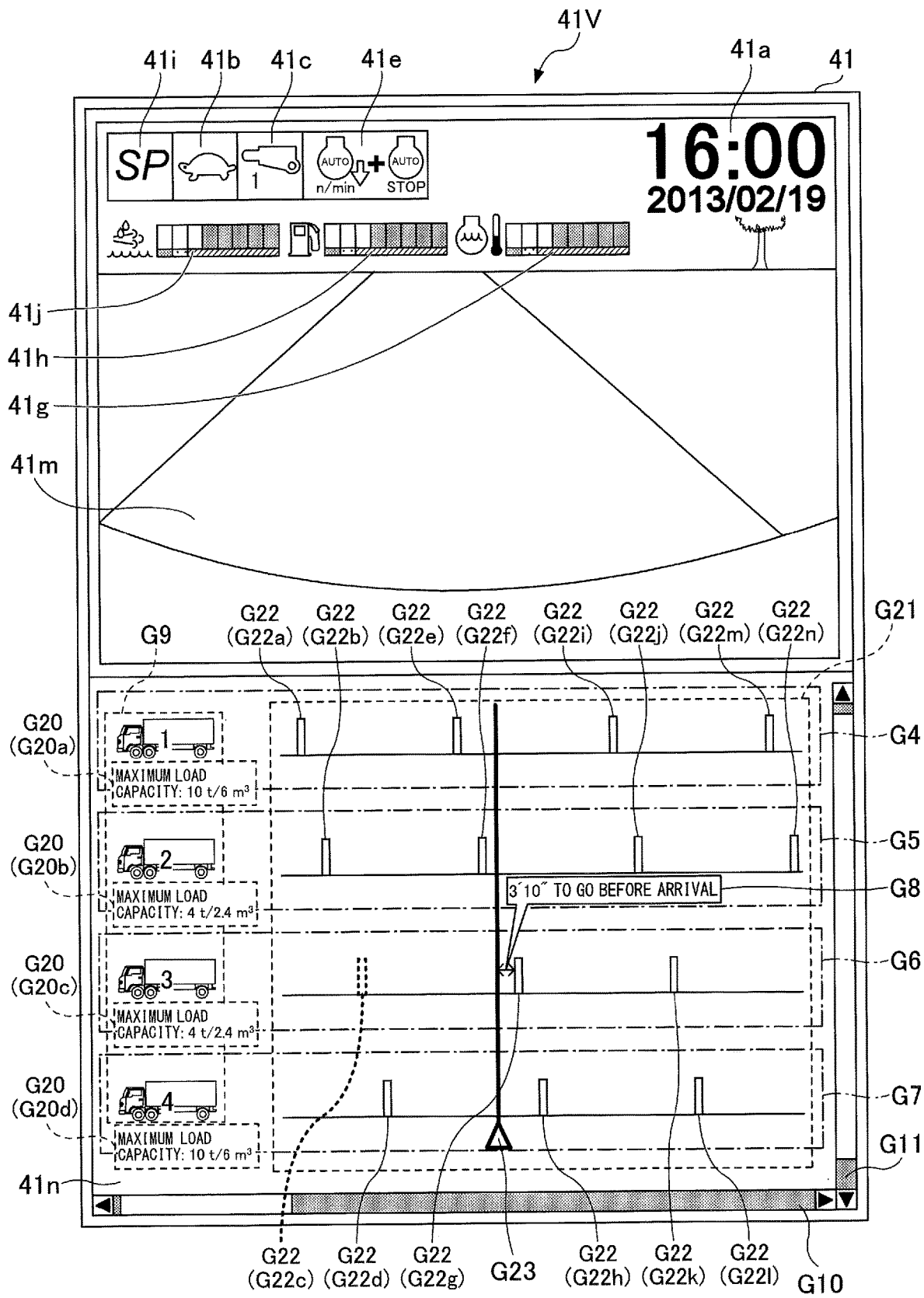
FIG. 8 is still another display example of the main screen.

Next, yet another example configuration of the main screen 41V displayed on the display device 40 is described with reference to FIG. 8. The main screen 41V of FIG. 8 is different from the main screen 41V of FIG. 6 in the contents of display of the dumper information display area 41*n*. The dashed line and the one-dot chain line in the dumper information display area 41*n* are for illustrative purposes, and are not actually displayed.

Specifically, the dumper information display area 41*n* of FIG. 8 includes the first dumper display area G4, the second dumper display area G5, the third dumper display area G6, and the fourth dumper display area G7, the remaining time display area G8, the dumper image display area G9, the horizontal scroll bar G10, the vertical scroll bar G11, a maximum load capacity display area G20, and an arrival interval display area G21.

The first dumper display area G4 is an area for displaying information on the first dumper. Likewise, the second dumper display area G5 is an area for displaying information on the second dumper, the third dumper display area G6 is an area for displaying information on the third dumper, and the fourth dumper display area G7 is an area for displaying information on the fourth dumper.

The remaining time display area G8 is an area for displaying information on the remaining time. The dumper image display area G9 is an area where as many dumper images as the number of dumpers in use are displayed. According to the illustration of FIG. 8, four dumper images are displayed.

The horizontal scroll bar G10 indicates the horizontal scroll state of the dumper information display area 41*n*. The vertical scroll bar G11 indicates the vertical scroll state of the dumper information display area 41*n*. The operator can operate the horizontal scroll bar G10 and the vertical scroll bar G11 through a touchscreen serving as the input device 42, for example.

The maximum load capacity display area G20 is an area for displaying a maximum load capacity. According to the illustration of FIG. 8, the maximum load capacity display area G20 includes areas G20a through G20d. The area G20a displays the maximum load capacity of the first dumper. The area G20b displays the maximum load capacity of the second dumper. The area G20c displays the maximum load capacity of the third dumper. The area G20d displays the maximum load capacity of the fourth dumper.

For example, the controller 30 identifies the maximum load capacity of a dumper by identifying the size or the class code of the license plate of the dumper appearing in the output image of the image capturing device 80 through image recognition. The controller 30 may identify the maximum load capacity of a dumper based on information emitted by a device such as a beacon based on a Wi-Fi (registered trademark) or Bluetooth (registered trademark)-related communication standard installed in the dumper. At this point, the controller 30 may determine that the dumper has arrived at a loading position. The controller 30 may identify the maximum load capacity of a dumper or determine the arrival of a dumper at a loading position based on information from a portable information terminal of the dumper driver received through communications based on a Wi-Fi (registered trademark) or Bluetooth (registered trademark)-related communication standard. Thus, the controller 30 may identify a dumper through communications.

The controller 30 may display the maximum load capacity of a dumper in weight (unit: "t (ton)"), in volume (unit: "m³ (cubic meter)"), or in both weight and volume. According to the illustration of FIG. 8, the maximum load capacity of each dumper is displayed in both weight and volume.

The controller 30 may be configured to identify an entity to which a dumper belongs in the same manner as the maximum load capacity of a dumper. The entity to which a dumper belongs is, for example, a corporation, sole proprietor or the like that possesses the dumper. In the case of succeeding in identifying an entity to which a dumper belongs, the controller 30 may change the color or shape of a dumper image displayed in the dumper image display area G9 to enable the operator of the shovel to distinguish the entity to which the dumper belongs.

The arrival interval display area G21 is an area for displaying intervals at which dumpers arrive. According to the illustration of FIG. 8, the arrival intervals of dumpers are displayed using an arrival time point display image G22 and a current time point display image G23 in the arrival interval display area G21.

The arrival time point display image G22 is a figure that represents a point of time at which each dumper arrived or a point of time at which each dumper is to arrive at a work site. According to FIG. 8, the arrival time point display image G22 includes bar figures that represent the points of time of the past arrivals and the points of time of the future arrivals of each dumper.

The current time point display image G23 is a figure that represents a current point of time. According to FIG. 8, the current time point display image G23 is formed of a combination of a triangle and a straight line extending from one of its vertices. The current time point display image G23 is configured to move rightward within the main screen 41V with the passage of time. The current time point display image G23 may alternatively be fixed at a predetermined position within the main screen 41V. In this case, each image of the arrival time point display image G22 may be configured to move leftward within the main screen 41V with the passage of time.

According to the illustration of FIG. 8, the arrival time point display image G22 to the left of the current time point display image G23 represents the points of time of the past arrivals of each dumper, and the arrival time point display image G22 to the right of the current time point display image G23 represents the points of time of the further arrivals of each dumper. Specifically, the arrival time point display image G22 includes images G22a through G22n. The image G22a represents the point of time of the last arrival but one of the first dumper. The image G22b represents the point of time of the last arrival but one of the second dumper. The image G22c represents the point of time of the last arrival of the third dumper. The image G22d represents the point of time of the last arrival of the fourth dumper. The image G22e represents the point of time of the last arrival of the first dumper. The image G22f represents the point of time of the last arrival of the second dumper. The image G22g represents the point of time of the next arrival of the third dumper. The image G22h represents the point of time of the next arrival of the fourth dumper. The image G22i represents the point of time of the next arrival of the first dumper. The image G22j represents the point of time of the next arrival of the second dumper. The image G22k represents the point of time of the arrival after the next of the third dumper. The image G22l represents the point of time of the arrival after the next of the fourth dumper. The image G22m represents the point of time of the arrival after the next of the first dumper. The image G22n represents the point of time of the arrival after the next of the second dumper.

Furthermore, according to the illustration of FIG. 8, the arrival time point display image G22 is displayed in such a manner as to be arranged along a straight line set for each dumper, like a waveform on a time chart. Time axes that are straight lines set one for each dumper have a common width, and the same horizontal positions on the time axes indicate the same time. Specifically, the images G22a, G22e, G22i, and G22m are images associated with the first dumper, and are therefore displayed in such a manner as to be arranged along the first line within the first dumper display area G4. Likewise, the images G22b, G22f, G22j, and G22n are images associated with the second dumper, and are therefore displayed in such a manner as to be arranged along the second line within the second dumper display area G5. The images G22c, G22g, and G22k are images associated with the third dumper, and are therefore displayed in such a manner as to be arranged along the third line within the third dumper display area G6. The images G22d, G22h, and G22l are images associated with the fourth dumper, and are therefore displayed in such a manner as to be arranged along the fourth line within the fourth dumper display area G7. The arrival time point display image G22 may be displayed not only in such a manner as to be arranged along a straight line as illustrated in FIG. 8 but also in such a manner as to be arranged along a curve such as the outline of a circular analog clock image.

According to the illustration of FIG. 8, the current time point display image G23 is positioned to the right of the image G22f and to the left of the image G22g. This represents that the current point of time is after the arrival of the second dumper at the work site and before the arrival of the third dumper at the work site. Therefore, 3' 10" TO GO BEFORE ARRIVAL displayed in the remaining time display area G8 represents that the remaining time before the arrival of the third dumper is 3 minutes and 10 seconds.

The arrival time point display image G22 may be so configured as to be changeable in display position. For example, when the display device 40 includes a touchscreen, the operator of the shovel can move a desired arrival time point display image G22 by dragging the desired arrival time point display image G22. For example, in response to receiving a phone call or the like reporting an approximately 10-minute arrival delay from the driver of the third dumper, the operator may move the image G22g rightward by a distance commensurate with 10 minutes. In this case, the remaining time displayed in the remaining time display area G8 is updated to 13' 10", with the addition of 10 minutes, as the image G22g moves rightward. If the fourth dumper is expected to arrive before the third dumper, the remaining time displayed in the remaining time display area G8 may be switched to the remaining time before the arrival of the fourth dumper.

The arrival time point display image G22 may be configured to be erasable. For example, when the display device 40 includes a touchscreen, the operator of the shovel can erase a desired arrival time point display image G22 by flicking the desired arrival time point display image G22. The operator may erase a desired arrival time point display image G22 by double-tapping the desired arrival time point display image G22 to pop up a command selection window and selecting an ERASE command. For example, in response to receiving a phone call or the like reporting the inability to head for the work site from the driver of the third dumper, the operator may erase the image G22g. In this case, the remaining time displayed in the remaining time display area G8 is switched to the remaining time before the arrival of the fourth dumper. In the arrival interval display area G21, a double-headed arrow is displayed between the image G22h associated with the fourth dumper and the current time point display image G23, and the remaining time before the arrival of the fourth dumper is displayed in the remaining time display area G8 as a speech balloon image extending from the double-headed arrow.

The arrival time point display image G22 may also be so configured as to be changeable in display mode such as color, line type or the like. For example, when the display device 40 includes a touchscreen, the operator of the shovel may change the display mode of a desired arrival time point display image G22 by double-tapping the desired arrival time point display image G22 to pop up a command selection window and selecting a command to change display mode. For example, when the shovel has not loaded the third dumper that has arrived at the work site, the operator may change the line type of the image G22c associated with the third dumper from a solid line to a dotted line, in order that a person who looks at the dumper information display area 41n can be aware that the shovel has not loaded the third dumper. A situation where a dumper is not loaded by this shovel in spite of the dumper's arrival at a work site occurs, for example, when the dumper that has arrived at the work site is loaded by a shovel different from this shovel. In response to determining that a dumper will not come to the work site, the operator of the shovel may change the display mode of the arrival time point display image G22 with respect to the dumper. For example, in response to receiving a phone call or the like reporting that the second dumper will not come to the work site, the operator may change the color of the images G22j and G22n through the same operation as described above, in order that a person who looks at the dumper information display area 41n can be aware that the second dumper will not come to the work site from the current point of time forward. According to this configuration, a person who looks at the dumper information display area 41n can understand intervals at which a dumper comes to or does not come to a work site.

By looking at the dumper information display area 41n of FIG. 8 as described above, the operator of the shovel can be easily aware of the remaining time before the arrival of the next dumper. Furthermore, the operator can easily understand which of the first through fourth dumpers is the next dumper. Moreover, the operator can be aware of the past arrival times of each dumper and the future arrival times of each dumper simultaneously. Specifically, the operator can have a rough idea of not only the arrival time of the third dumper to arrive next but also the arrival times of the fourth dumper, the first dumper, and the second dumper.

Furthermore, the operator of the shovel can operate the arrival time point display image G22. Therefore, even when erasing the arrival time point display image G22 or changing its position, the operator of the shovel can be easily aware of the remaining time before the arrival of the next dumper. This is because the remaining time is updated as the arrival time point display image G22 is erased or moved.

In a configuration where the shovel and a dumper are connected by radio, when the driver of the dumper inputs or updates the estimated time of arrival of the dumper at a work site through an input device or the like, the position of the arrival time point display image G22 displayed on the display device 40 may be automatically changed in response to the input or update. Furthermore, when the driver of the dumper deletes the estimated time of arrival through an input device or the like, the arrival time point display image G22 associated with the dumper displayed on the display device 40 may be automatically erased in response to the deletion.

FIG. 8 illustrates an example of display that displays the estimated times of arrival of multiple dumpers with respect to a single shovel, while the shovel may share the estimated times of arrival of the dumpers with one or more other shovels via a communications device. This is because when multiple shovels work together at a single work site, whether the loading of a particular dumper is to be performed by one shovel or another shovel is not determined until immediately before the loading is actually started. In this case, the controller 30 may cause the display color of the arrival time point display image G22 to differ from shovel to shovel in order to show by which shovel the loading has been actually performed.

Figure 9:
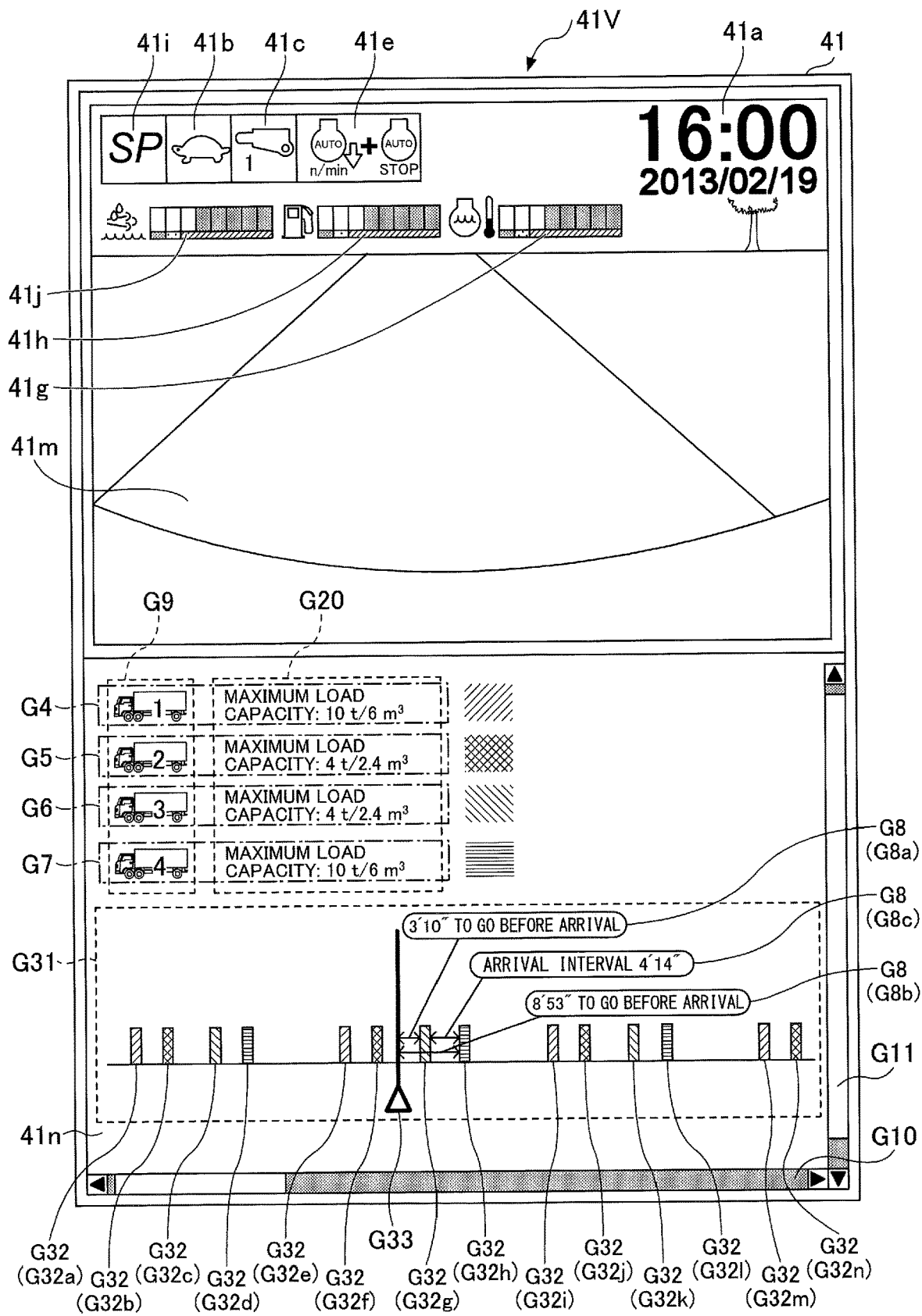
FIG. 9 is still another display example of the main screen.

Next, still another example configuration of the main screen 41V displayed on the display device 40 is described with reference to FIG. 9. The main screen 41V of FIG. 9 is different from the main screen 41V of FIG. 8 in the contents of display of the dumper information display area 41n. The dashed line and the one-dot chain line in the dumper information display area 41n are for illustrative purposes, and are not actually displayed.

Specifically, the dumper information display area 41n of FIG. 9 includes the first dumper display area G4, the second dumper display area G5, the third dumper display area G6, and the fourth dumper display area G7, the remaining time display area G8, the dumper image display area G9, the horizontal scroll bar G10, the vertical scroll bar G11, the maximum load capacity display area G20, and an arrival interval display area G31.

The remaining time display area G8 is an area for displaying information on the remaining time. According to the illustration of FIG. 9, the remaining time display area G8 includes a remaining time display area G8a, a remaining time display area G8b, and a remaining time display area G8c. The remaining time display area G8a displays information on the remaining time before the arrival of the next dumper. The remaining time display area G8b displays information on the remaining time before the arrival of the dumper after the next. The remaining time display area G8c displays the remaining time (arrival interval) before the arrival of the dumper after the next after the arrival of the next dumper.

The arrival interval display area G31 is an area for displaying intervals at which dumpers arrive, the same as the arrival interval display area G21 of FIG. 8. According to FIG. 9, in the arrival interval display area G31, the arrival intervals of the dumpers are displayed using an arrival time point display image G32 and a current time point display image G33.

The arrival time point display image G32 is a figure that represents a point of time at which each dumper arrived or a point of time at which each dumper is to arrive at a work site. According to FIG. 9, the arrival time point display image G32 includes bar figures that represent the points of time of the past arrivals and the points of time of the future arrivals of each dumper, which differ in color among the dumpers.

The current time point display image G33 is a figure that represents a current point of time. According to FIG. 9, the current time point display image G33 is formed of a combination of a triangle and a straight line extending from one of its vertices, the same as the current time point display image G23 of FIG. 8. The current time point display image G33 is configured to move rightward within the main screen 41V with the passage of time. The current time point display image G33 may alternatively be fixed at a predetermined position within the main screen 41V. In this case, each image of the arrival time point display image G32 may be configured to move leftward within the main screen 41V with the passage of time.

According to the illustration of FIG. 9, the arrival time point display image G32 to the left of the current time point display image G33 represents the points of time of the past arrivals of each dumper, and the arrival time point display image G32 to the right of the current time point display image G33 represents the points of time of the further arrivals of each dumper. Specifically, the arrival time point display image G32 includes images G32a through G32n. The image G32a represents the point of time of the last arrival but one of the first dumper. The image G32b represents the point of time of the last arrival but one of the second dumper. The image G32c represents the point of time of the last arrival of the third dumper. The image G32d represents the point of time of the last arrival of the fourth dumper. The image G32e represents the point of time of the last arrival of the first dumper. The image G32f represents the point of time of the last arrival of the second dumper. The image G32g represents the point of time of the next arrival of the third dumper. The image G32h represents the point of time of the next arrival of the fourth dumper. The image G32i represents the point of time of the next arrival of the first dumper. The image G32j represents the point of time of the next arrival of the second dumper. The image G32k represents the point of time of the arrival after the next of the third dumper. The image G32l represents the point of time of the arrival after the next of the fourth dumper. The image G32m represents the point of time of the arrival after the next of the first dumper. The image G32n represents the point of time of the arrival after the next of the second dumper.

Furthermore, according to the illustration of FIG. 9, the arrival time point display image G32 with respect to the multiple dumpers is displayed in such a manner as to be arranged along the same single straight line, like a waveform on a time chart. The arrival interval display area G31 illustrated in FIG. 9 shows the arrival times of the multiple dumpers using a common time axis, the same as the arrival interval display area G21 of FIG. 8. Specifically, in the arrival interval display area G31 illustrated in FIG. 9, all of the images 32a through 32n are so displayed as to be horizontally arranged along the single straight line. In this respect, the arrival interval display area G31 illustrated in FIG. 9 is different from the arrival interval display area G21 illustrated of FIG. 8, which is displayed along a straight line that differs from dumper to dumper. The arrival time point display image G32, however, may be displayed not only in such a manner as to be arranged along a straight line but also in such a manner as to be arranged along a curve such as the outline of a circular analog clock image, the same as in the case of FIG. 8.

According to the illustration of FIG. 9, the current time point display image G33 is positioned to the right of the image G32f and to the left of the image G32g. This represents that the current point of time is after the arrival of the second dumper at the work site and before the arrival of the third dumper at the work site. Therefore, 3' 10" TO GO BEFORE ARRIVAL displayed in the remaining time display area G8a represents that the remaining time before the arrival of the third dumper, which is the next dumper, is 3 minutes and 10 seconds. 8' 53" TO GO BEFORE ARRIVAL displayed in the remaining time display area G8b represents that the remaining time before the arrival of the fourth dumper, which is the second next dumper, is 8 minutes and 53 seconds. Furthermore, ARRIVAL INTERVAL 4' 14" displayed in the remaining time display area G8c represents that the remaining time (arrival interval) before the arrival of the fourth dumper after the arrival of the third dumper is 4 minutes and 14 seconds.

By looking at the dumper information display area 41n of FIG. 9, the operator of the shovel can be easily aware of the remaining time before the arrival of the next dumper. Furthermore, the operator can easily understand which of the first through fourth dumpers is the next dumper. Moreover, the operator can be aware of the past arrival times of each dumper and the future arrival times of each dumper simultaneously. Specifically, the operator can have a rough idea of not only the arrival time of the third dumper to arrive next but also the arrival times of the fourth dumper, the first dumper, and the second dumper.

Figure 10:
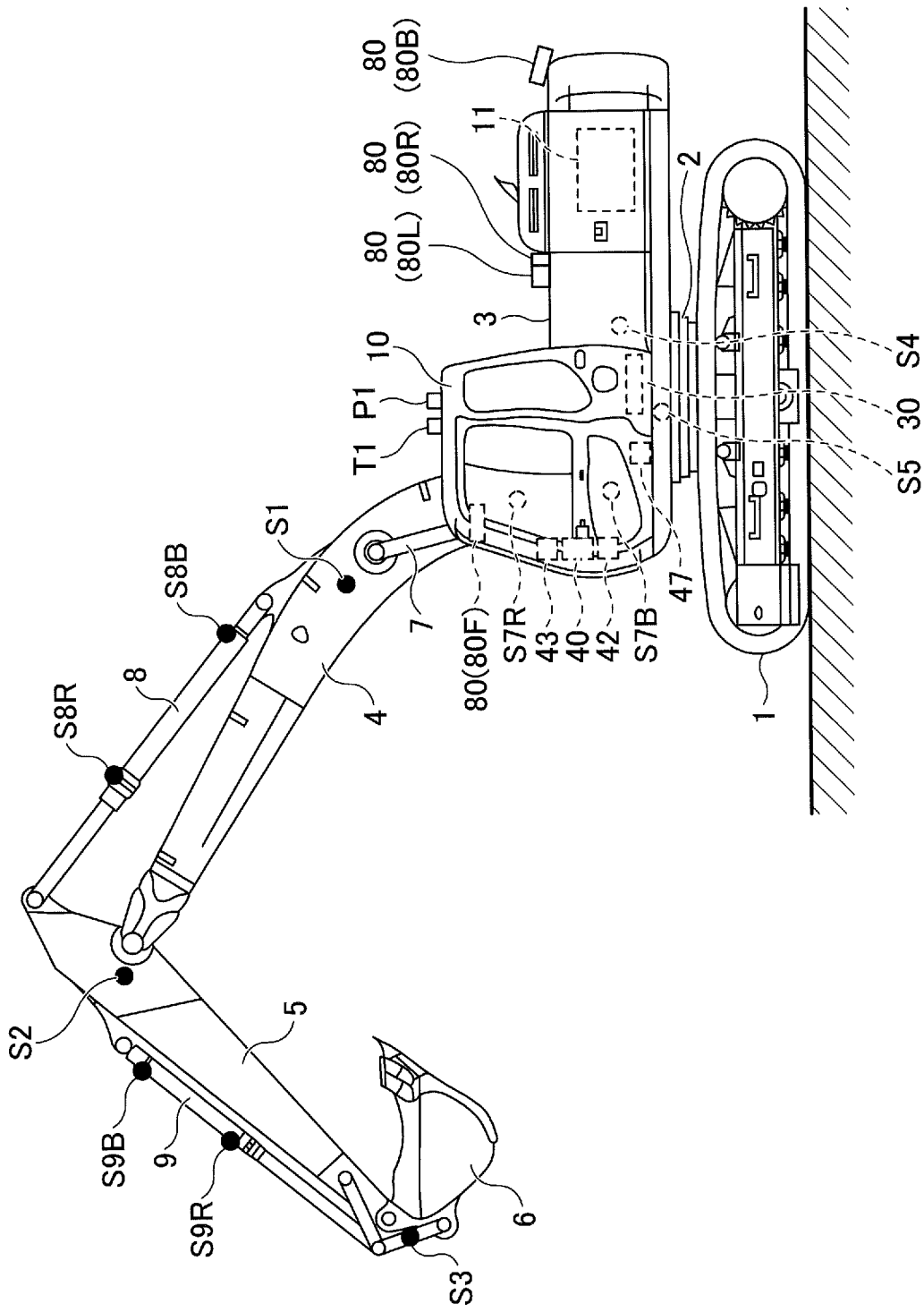
FIG. 10 is a side view of another shovel according to the embodiment of the present invention.

Next, another example configuration of the shovel (excavator) according to the embodiment of the present invention is described with reference to FIG. 10. FIG. 10 is a side view of the shovel, illustrating another example configuration of the shovel according to the embodiment of the present invention.

According to the shovel of FIG. 10, a boom angle sensor S1 is attached to the boom 4, an arm angle sensor S2 is attached to the arm 5, and a bucket angle sensor S3 is attached to the bucket 6.

The boom angle sensor S1 detects the rotation angle of the boom 4. According to this embodiment, the boom angle sensor S1 is an acceleration sensor and can detect the rotation angle of the boom 4 relative to the upper turning body 3 (hereinafter, "boom angle"). The boom angle is smallest when the boom 4 is lowest, and increases as the boom 4 is raised, for example.

The arm angle sensor S2 detects the rotation angle of the arm 5. According to this embodiment, the arm angle sensor S2 is an acceleration sensor and can detect the rotation angle of the arm 5 relative to the boom 4 (hereinafter, "arm angle"). The arm angle is smallest when the arm 5 is most closed, and increases as the arm 5 is opened, for example.

The bucket angle sensor S3 detects the rotation angle of the bucket 6. According to this embodiment, the bucket angle sensor S3 is an acceleration sensor and can detect the rotation angle of the bucket 6 relative to the arm 5 (hereinafter, "bucket angle"). The bucket angle is smallest when the bucket 6 is most closed and increases as the bucket 6 is opened, for example.

Each of the boom angle sensor S1, the arm angle sensor S2, and the bucket angle sensor S3 may alternatively be a potentiometer using a variable resistor, a stroke sensor that detects the stroke amount of a corresponding hydraulic cylinder, a rotary encoder that detects a rotation angle about a link pin, a gyro sensor, a combination of an acceleration sensor and a gyro sensor, or the like.

A boom rod pressure sensor S7R and a boom bottom pressure sensor S7B are attached to the boom cylinder 7. An arm rod pressure sensor S8R and an arm bottom pressure sensor S8B are attached to the arm cylinder 8. A bucket rod pressure sensor S9R and a bucket bottom pressure sensor S9B are attached to the bucket cylinder 9. The boom rod pressure sensor S7R, the boom bottom pressure sensor S7B, the arm rod pressure sensor S8R, the arm bottom pressure sensor S8B, the bucket rod pressure sensor S9R, and the bucket bottom pressure sensor S9B are also collectively referred to as "cylinder pressure sensor."

The boom rod pressure sensor S7R detects the pressure of the rod-side oil chamber of the boom cylinder 7 (hereinafter, "boom rod pressure"), and the boom bottom pressure sensor S7B detects the pressure of the bottom-side oil chamber of the boom cylinder 7 (hereinafter, "boom bottom pressure"). The arm rod pressure sensor S8R detects the pressure of the rod-side oil chamber of the arm cylinder 8 (hereinafter, "arm rod pressure"), and the arm bottom pressure sensor S8B detects the pressure of the bottom-side oil chamber of the arm cylinder 8 (hereinafter, "arm bottom pressure"). The bucket rod pressure sensor S9R detects the pressure of the rod-side oil chamber of the bucket cylinder 9 (hereinafter, "bucket rod pressure"), and the bucket bottom pressure sensor S9B detects the pressure of the bottom-side oil chamber of the bucket cylinder 9 (hereinafter, "bucket bottom pressure").

The cab 10 is provided and a power source such as the engine 11 is mounted on the upper turning body 3. The controller 30, the display device 40, the input device 42, an audio output device 43, a storage device 47, a positioning device P1, a body tilt sensor S4, a turning angular velocity sensor S5, the image capturing device 80, and a communications device T1 are attached to the upper turning body 3. An electric power accumulating unit that supplies electric power, a motor generator that generates electric power using the rotational driving force of the engine 11, etc., may be mounted on the upper turning body 3. Examples of the electric power accumulating unit include a capacitor and a lithium-ion battery. The motor generator may operate as a generator to supply electric power to electrical loads and may operate as an electric motor to assist the rotation of the engine 11.

The controller 30 operates as a main control part to control the driving of the shovel. According to this embodiment, the controller 30 is composed of a computer including a CPU, a RAM, a ROM, etc. Various functions of the controller 30 are implemented by the CPU executing programs stored in the ROM, for example. The various functions may include, for example, a machine guidance function to guide (give directions to) the operator in manually operating the shovel and a machine control function to automatically assist the operator manually operating the shovel.

The display device 40 displays various kinds of information. The display device 40 may be connected to the controller 30 via a communications network such as a CAN or may be connected to the controller 30 via a dedicated line.

The input device 42 is configured such that the operator can input various kinds of information to the controller 30. The input device 42 may include at least one of, for example, a touchscreen, a microphone, a knob switch, and a membrane switch installed in the cab 10.

The audio output device 43 is configured to output audio. Examples of the audio output device 43 may include a loudspeaker connected to the controller 30 and an alarm such as a buzzer. According to this embodiment, the audio output device 43 is configured to output various kinds of audio information in response to an audio output command from the controller 30.

The storage device 47 is configured to store various kinds of information. Examples of the storage device 47 may include a nonvolatile storage medium such as a semiconductor memory. The storage device 47 may store the output information of various devices while the shovel is in motion and may store information obtained through various devices before the shovel is put in motion. The storage device 47 may store, for example, data obtained through the communications device T1, etc.

The positioning device P1 is configured to measure the position of the upper turning body 3. The positioning device P1 may be configured to additionally measure the orientation of the upper turning body 3. The positioning device P1 is, for example, a GNSS compass, and detects the position and orientation of the upper turning body 3 to output detection values to the controller 30. Therefore, the positioning device P1 can operate as an orientation detector to detect the orientation of the upper turning body 3. The orientation detector may be an azimuth sensor such as a geomagnetic sensor attached to the upper turning body 3.

The body tilt sensor S4 is configured to detect the inclination of the upper turning body 3 to a horizontal plane, for example. According to this embodiment, the body tilt sensor S4 is an acceleration sensor that detects the longitudinal tilt angle around the longitudinal axis and the lateral tilt angle around the lateral axis of the upper turning body 3. For example, the longitudinal axis and the lateral axis of the upper turning body 3 are perpendicular to each other at the center point of the shovel that is a point on the turning axis of the shovel.

The turning angular velocity sensor S5 is configured to detect the turning angular velocity of the upper turning body 3. The turning angular velocity sensor S5 may be configured to detect the turning angle of the upper turning body 3. According to this embodiment, the turning angular velocity sensor S5 is a gyro sensor, but may be a resolver, a rotary encoder, or the like.

The image capturing device 80 is configured to obtain an image of an area surrounding the shovel. According to this embodiment, the image capturing device 80 includes a front camera 80F that captures an image of a space in front of the shovel, a left camera 80L that captures an image of a space to the left of the shovel, a right camera 80R that captures an image of a space to the right of the shovel, and a back camera 80B that captures an image of a space behind the shovel.

The image capturing device 80 is, for example, a stereo camera including an imaging device such as a CCD or a CMOS, and outputs captured images to the controller 30. The image capturing device 80 may be a monocular camera, a distance image camera, or the like. The image capturing device 80 may be configured to calculate the distance from the image capturing device 80 or the shovel to a recognized object. In this case, the image capturing device 80 may be replaced with an environment recognition device such as a LIDAR.

The front camera 80F is attached to, for example, the ceiling of the cab 10, namely, the inside of the cab 10. The front camera 80F may alternatively be attached to the outside of the cab 10, such as the roof of the cab 10 or the side of the boom 4. The left camera 80L is attached to the left end of the upper surface of the upper turning body 3. The right camera 80R is attached to the right end of the upper surface of the upper turning body 3. The back camera 80B is attached to the back end of the upper surface of the upper turning body 3.

The communications device T1 is configured to control communications with external apparatuses outside the shovel. According to this embodiment, the communications device T1 controls communications with external apparatuses via at least one of a satellite communications network, a cellular phone network, the Internet, etc.

Figure 11:
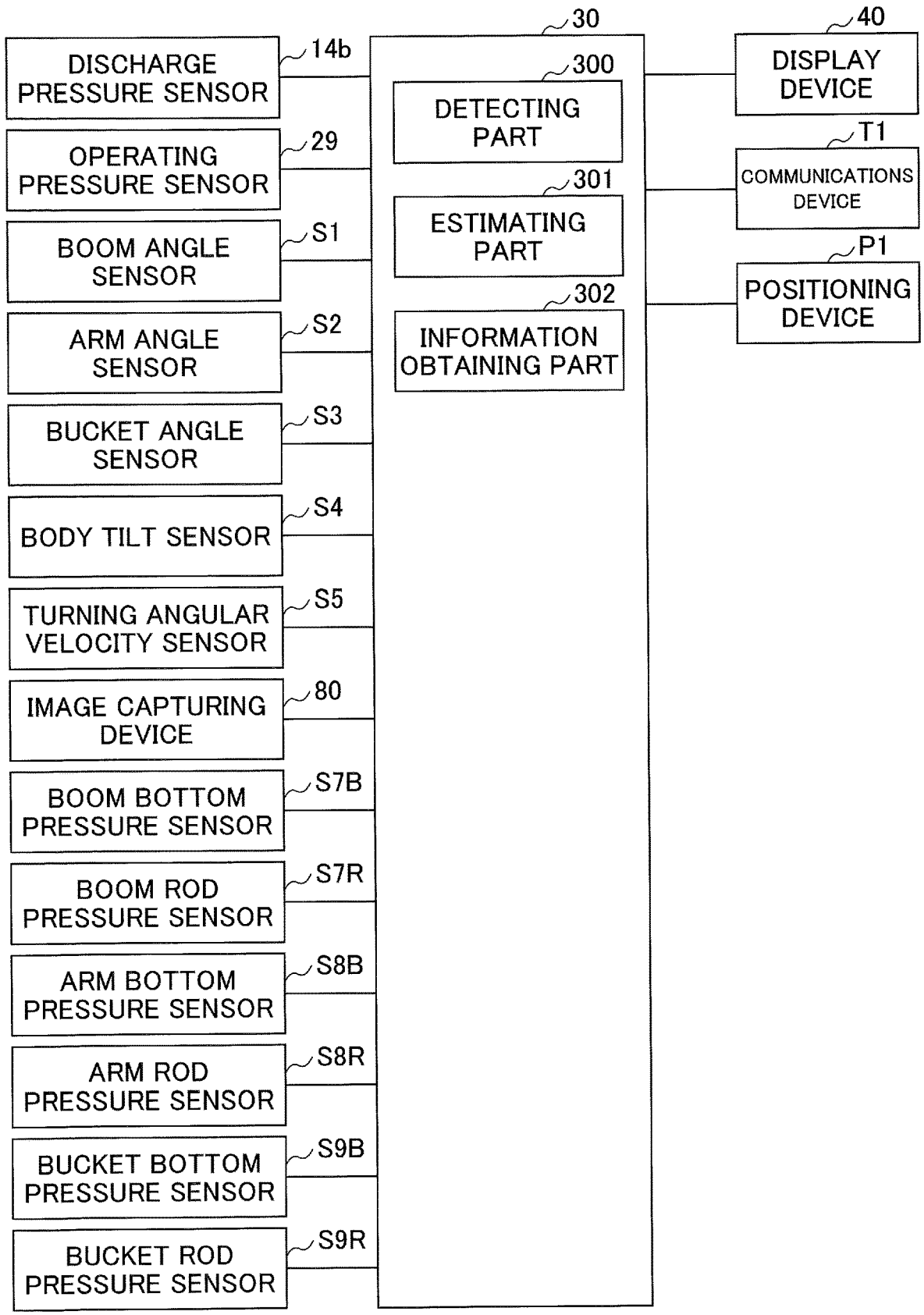
FIG. 11 is a diagram illustrating an example configuration of a controller.

Next, an example configuration of the controller 30 installed in the shovel of FIG. 10 is described with reference to FIG. 11. FIG. 11 is a diagram illustrating an example configuration of the controller 30. The controller 30 of FIG. 11 obtains the output of at least one of the discharge pressure sensor 14b, the operating pressure sensor 29, an information obtaining device, etc., and executes computation with various functional elements. The various functional elements include the detecting part 300, the estimating part 301, and an information obtaining part 302. The information obtaining device includes at least one of the boom angle sensor S1, the arm angle sensor S2, the bucket angle sensor S3, the body tilt sensor S4, the turning angular velocity sensor S5, the image capturing device 80, the boom bottom pressure sensor S7B, the boom rod pressure sensor S7R, the arm bottom pressure sensor S8B, the arm rod pressure sensor S8R, the bucket bottom pressure sensor S9B, the bucket rod pressure sensor S9R, the communications device T1, the positioning device P1, etc.

The information obtaining part 302 is configured to obtain information on excavation weight that is the weight of an excavated object excavated by the excavating motion of the excavation attachment. According to this embodiment, the information obtaining part 302 is configured to obtain information on the excavation weight based on the output of at least one of the discharge pressure sensor 14b, the operating pressure sensor 29, the information obtaining device, etc.

For example, the information obtaining part 302 calculates the weight of an excavated object such as soil excavated by the excavation attachment as the excavation weight based on a distance image regarding a space in front of the shovel captured by a stereo camera serving as the image capturing device 80. The image capturing device 80 may be replaced with a three-dimensional laser scanner, a LIDAR, or the like. Specifically, the information obtaining part 302 calculates an excavation volume that is the volume of an excavated object excavated by a single excavating motion based on a distance image captured at the start of the excavating motion and a distance image captured at the completion of the excavating motion. Then, the information obtaining part 302 calculates the excavation weight by multiplying the excavation volume by the density of the excavated object. The density of the excavated object may be either a preset value or a value dynamically set using the input device 42, etc.

Thus, the information obtaining part 302 can compare a landform before excavation and a landform after excavation and calculate an excavation weight from a single excavating motion based on the change. The single excavating motion is a motion to scoop an excavated object into the bucket 6, and for example, is determined to be started when the bucket 6 containing no excavated object contacts the ground and is determined to be complete when the bucket 6 containing the excavated object leaves the ground. The condition for determining the start of the excavating motion and the condition for determining the completion of the excavating motion, however, may be set as desired. For example, the information obtaining part 302 may determine whether the excavating motion is started and whether the excavating motion is complete based on the output of at least one of the operating pressure sensor 29, the cylinder pressure sensor, etc.

The information obtaining part 302 may also determine whether the excavating motion is started and whether the excavating motion is complete based on the output of a posture sensor that detects the posture of the excavation attachment. Examples of the posture sensor include the boom angle sensor S1, the arm angle sensor S2, and the bucket angle sensor S3. The posture sensor may be a combination of a boom cylinder stroke sensor, an arm cylinder stroke sensor, and a bucket cylinder stroke sensor.

According to this configuration, the controller 30 can calculate the cumulative value of the weight of an excavated object with respect to one or more excavating motions performed within a predetermined period of time as a cumulative excavation weight in the predetermined period of time.

The information obtaining part 302 may calculate an excavation weight from a single excavating motion based on the outputs of the posture sensor and the cylinder pressure sensor. For example, the information obtaining part 302 may calculate the weight of an excavated object excavated by a single excavating motion as the excavation weight based on the posture of the excavation attachment and the boom bottom pressure when the bucket 6 containing the excavated object is lifted up in the air.

The information obtaining part 302 may calculate the excavation weight based on changes over time in the position of a predetermined part of the bucket 6. The predetermined part of the bucket 6 is, for example, the teeth tips of the bucket 6. For example, the information obtaining part 302 calculates the position of the teeth tips of the bucket 6 based on the rotation angle of each of the boom 4, the arm 5, and the bucket 6.

In this case, for example, the information obtaining part 302 derives a landform before the start of an excavating motion based on a distance image regarding a space in front of the shovel generated by a three-dimensional image sensor installed in an aerial vehicle. The three-dimensional image sensor installed in the aerial vehicle may be any of a three-dimensional laser scanner, a stereo camera, and a LIDAR. The aerial vehicle is, for example, a multicopter, an airship or the like, and is provided with a positioning device so that the position and orientation of the actual ground corresponding to the distance image can be specified. Furthermore, the aerial vehicle is provided with a communications device that enables communications with the shovel.

For example, the information obtaining part 302 receives a distance image generated by a stereo camera attached to the aerial vehicle via the communications device T1, and derives a landform before the start of an excavating motion based on the distance image. The information obtaining part 302 may be configured to receive an image captured by the stereo camera via the communications device T1, generate a distance image from the image, and derives a landform before the start of an excavating motion based on the distance image.

Thereafter, for example, the information obtaining part 302 may calculate the excavation volume based on the trajectory of the calculated position of the teeth tips of the bucket 6 and the landform before the start of an excavating motion.

For example, the information obtaining part 302 may calculate the excavation volume from an image related to the bucket 6 captured by the front camera 80F serving as a monocular camera. Specifically, the information obtaining part 302 recognizes an image of an excavated object in the bucket 6 by performing various kinds of image processing on the image related to the bucket 6 captured by the front camera 80F when the bucket 6 containing the excavated object is lifted up in the air. Then, the information obtaining part 302 derives the excavation volume based on the size, etc., of the image of the excavated object. The information obtaining part 302 may additionally use the output of another information obtaining device such as the posture sensor to derive the excavation volume.

The information obtaining part 302 may be configured to obtain information on the density of an excavated object excavated by the excavating motion of the excavation attachment. Typically, the information obtaining part 302 may calculate the density of an excavated object based on the excavation volume and the excavation weight. The excavation volume may be calculated based on a landform before the start of an excavating motion and a landform after the completion of the excavating motion, for example. The excavation weight may be calculated based on the output of the cylinder pressure sensor, and may be calculated based on the output of the posture sensor and the output of the cylinder pressure sensor, for example.

Figure 12:
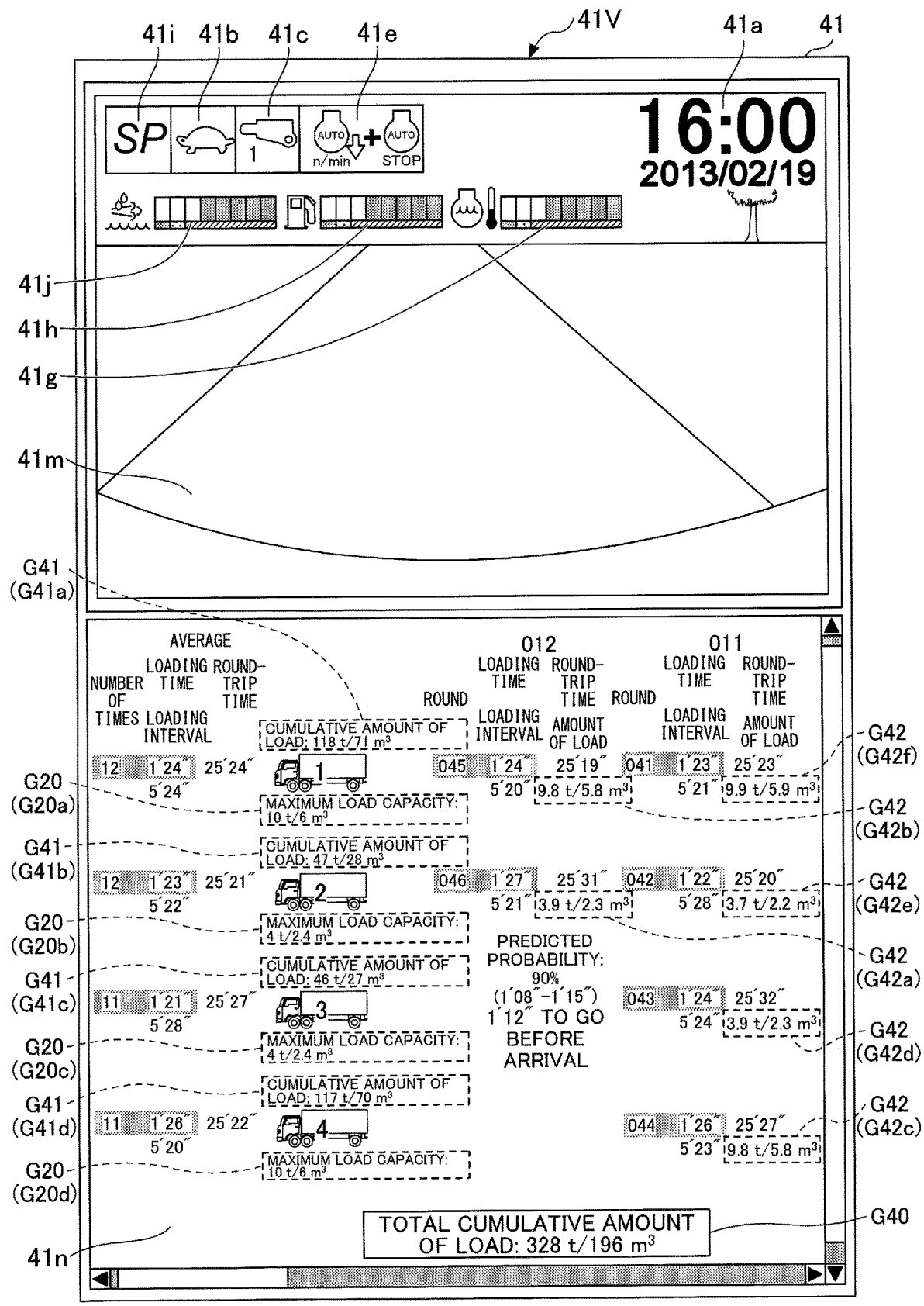
FIG. 12 is still another display example of the main screen.

Next, still another example configuration of the main screen 41V displayed on the display device 40 installed in the shovel of FIG. 10 is described with reference to FIG. 12. The main screen 41V of FIG. 12 is different from the main screen 41V of FIG. 6 in the contents of display of the dumper information display area 41n. Specifically, the main screen 41V of FIG. 12 is different from the main screen 41V of FIG. 6 in including the maximum load capacity display area G20, a total cumulative load amount display area G40, an individual cumulative load amount display area G41, and an individual round load amount display area G42, but is otherwise the same as the main screen 41V of FIG. 6. Therefore, a description of a common portion is omitted, and differences are described in detail. The dashed line and the one-dot chain line in the dumper information display area 41n are for illustrative purposes, and are not actually displayed.

As described in FIG. 8, the maximum load capacity display area G20 is an area for displaying a maximum load capacity. According to the illustration of FIG. 12, the maximum load capacity display area G20 includes the areas G20a through G20d. The area G20a displays the maximum load capacity of the first dumper. The area G20b displays the maximum load capacity of the second dumper. The area G20c displays the maximum load capacity of the third dumper. The area G20d displays the maximum load capacity of the fourth dumper.

For example, the controller 30 identifies the maximum load capacity of a dumper by identifying the size or the class code of the license plate of the dumper appearing in the output image of the image capturing device 80 through image recognition. The controller 30 may identify the maximum load capacity of a dumper based on information emitted by a device such as a beacon based on a Wi-Fi (registered trademark) or Bluetooth (registered trademark)-related communication standard installed in the dumper.

The controller 30 may display the maximum load capacity of a dumper in weight (unit: "t (ton)"), in volume (unit: "$m^3$ (cubic meter)"), or in both weight and volume. According to the illustration of FIG. 12, the maximum load capacity of each dumper is displayed in both weight and volume.

The total cumulative load amount display area G40 is an area for displaying the total amount of an excavated object loaded into dumpers by the shovel of FIG. 10 during a predetermined period. The predetermined period is, for example, a period from the work start time to the work end time of a day. According to the illustration of FIG. 12, the total cumulative load amount display area G40 displays a cumulative excavation weight that is the cumulative value of the weight (excavation weight) of an excavated object with respect to the individual excavating motions of the shovel as a total cumulative amount of load.

The individual cumulative load amount display area G41 is an area for displaying the amount of an excavated object loaded into a dumper by the shovel of FIG. 10 during a predetermined period with respect to each dumper. According to the illustration of FIG. 12, the individual cumulative load amount display area G41 includes areas G41a through G41d. The area G41a displays the cumulative amount of load of the first dumper. The area G41b displays the cumulative amount of load of the second dumper. The area G41c displays the cumulative amount of load of the third dumper. The area G41d displays the cumulative amount of load of the fourth dumper. The sum of the cumulative amounts of load of the first through fourth dumpers is equal to the total cumulative amount of load.

The individual round load amount display area G42 is an area for displaying the amount of an excavated object loaded into a dumper by the shovel of FIG. 10 during a single round of loading. According to the illustration of FIG. 12, the individual round load amount display area G42 includes areas G42a through G42f. The area G42a displays the amount of an excavated object loaded into the second dumper during the last round of loading. The area G42b displays the amount of an excavated object loaded into the first dumper during the last round but one (the second to the last round) of loading. The area G42c displays the amount of an excavated object loaded into the fourth dumper during the third to the last round of loading. Likewise, the area G42d displays the amount of an excavated object loaded into the third dumper during the fourth to the last round of loading. The area G42e displays the amount of an excavated object loaded into the second dumper during the fifth to the last round of loading. The area G42f displays the amount of an excavated object loaded into the first dumper during the sixth to the last round of loading.

For example, the controller 30 calculates and displays the cumulative amount of load based on the excavation weight calculated by the information obtaining part 302. The controller 30 may display the cumulative amount of load in weight (unit: "t (ton)"), in volume (unit: "m³ (cubic meter)"), or in both weight and volume. According to the illustration of FIG. 12, the cumulative amount of load in each of the total cumulative load amount display area G40, the individual cumulative load amount display area G41, and the individual round load amount display area G42 is displayed in both weight and volume. In the case of displaying volume, the controller 30 may calculate the volume of an excavated object based on the excavation weight calculated by the information obtaining part 302 and the density of the excavated object.

Here, the density of the excavated object may be registered in advance. The controller 30 may calculate the density of the excavated object by obtaining the volume of the excavated object based on an image captured by the image capturing device 80 and obtaining the excavation weight based on the output of the cylinder pressure sensor or the like. Furthermore, the controller 30 may cause the type of the excavated object to be displayed on the display device 40. The type of the excavated object is expressed using "RipRap3," "Coarse Sand" or the like serving as a substance symbol (material type), for example.

The operator may input the type of the excavated object in advance. The controller 30 may obtain information on the type of the excavated object from a management apparatus via a communications device. Furthermore, the controller 30 may infer the type of the excavated object based on the calculated density of the excavated object and an image captured by the image capturing device 80.

Figure 13:
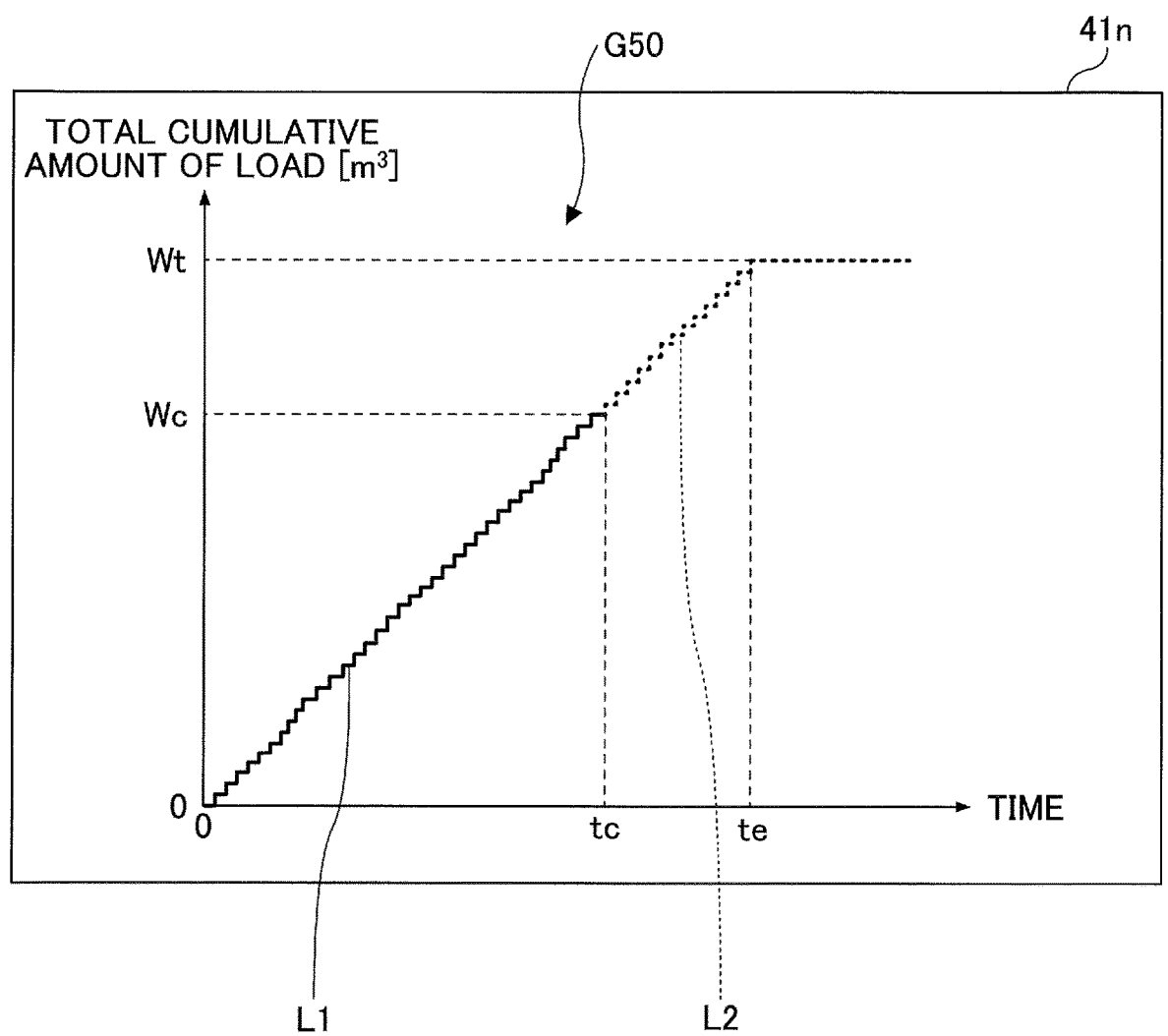
FIG. 13 is a display example of an image displayed in a dumper information display area.

Next, still another example configuration of the main screen 41V displayed on the display device 40 installed in the shovel of FIG. 10 is described with reference to FIG. 13. FIG. 13 illustrates a display example of an image displayed in the dumper information display area 41*n* of the main screen 41V.

The dumper information display area 41*n* of FIG. 13 includes a graph display area G50. The graph display area G50 may be included in a separate window displayed as a pop-up on the dumper information display area 41*n*.

The graph display area G50 is an area for displaying a total cumulative load amount graph that represents changes over time in the total cumulative amount of load. According to the total cumulative load amount graph of FIG. 13, the horizontal axis represents time and the vertical axis represents the total cumulative amount of load. In the drawing, "tc" represents a current time, "Wc" represents the current value of the total cumulative amount of load, "Wt" represents the target value of the total cumulative amount of load, and "te" represents a point of time at which the total cumulative amount of load is estimated to reach the target value.

A solid line L1 on the left side of the current time "tc" represents the past transition of the total cumulative amount of load, and a dotted line L2 on the right side of the current time "tc" represents the future transition of the total cumulative amount of load.

By looking at the total cumulative load amount graph of FIG. 13, the operator of the shovel can intuitively recognize that almost two-thirds of the target is complete with respect to loading. Furthermore, the operator can understand approximately how many more hours to go before the completion of loading.

When there are multiple shovels at one work site, the total cumulative load amount graph of FIG. 13 may show the sum of the total cumulative amounts of load of the shovels. In this case, it is easy to manage the total workload of the work site.

An embodiment of the present invention is described above. The present invention, however, is not limited to the above-described embodiment. Various variations and substitutions may apply to the above-described embodiment without departing from the scope of the present invention. Furthermore, the features described with reference to the above-described embodiment may be suitably combined as long as causing no technical contradiction.

For example, according to the illustration of FIG. 6, the main screen 41V is configured to include the dumper information display area 41*n*. The dumper information display area 41*n*, however, may be configured to be included in a dumper information screen separate from the main screen 41V. In this case, for example, the operator may cause information displayed in the dumper information display area 41*n* to be displayed by operating a predetermined screen change switch to switch the main screen 41V to the dumper information screen.

What is claimed is:

1. A shovel comprising:
a lower traveling body;
an upper turning body turnably mounted on the lower traveling body;
an attachment attached to the upper turning body and configured to perform loading of a transporter vehicle with an object;
a hardware processor configured to estimate time required for the transporter vehicle to dump the object and return based on a difference between a time of completion of first loading of the transporter vehicle with the object by the attachment and a time of a start of second loading of the transporter vehicle with the object by the attachment, the second loading being subsequent to the first loading; and
a display device configured to display remaining time calculated based on the estimated required time on a transporter vehicle basis,
wherein the display device is further configured to display a predicted probability that is a numerical value representing how certain the remaining time is.

2. The shovel as claimed in claim 1, wherein the displayed remaining time is time remaining before loading of a next transporter vehicle is performable.

3. The shovel as claimed in claim 2, wherein the time remaining before the loading of the next transporter vehicle is performable is updated with passage of time.

4. The shovel as claimed in claim 2, wherein the next transporter vehicle is one of a plurality of transporter vehicles.

5. The shovel as claimed in claim 1, wherein the required time and loading time from a start of loading to completion of the loading are recorded on the transporter vehicle basis.

6. The shovel as claimed in claim 1, wherein the display device is configured to estimate an arrival time of the transporter vehicle and to display time elapsed from the arrival time in a negative value as the remaining time upon detection of a delay of the transporter vehicle.

7. The shovel as claimed in claim 1, wherein the display device is configured to group a plurality of transporter vehicles as one set, and to distinguishably display information on a current set and information on a last or next set.

8. The shovel as claimed in claim 1, wherein the display device is configured to display an interval between arrivals of a plurality of transporter vehicles using a common time axis.

9. The shovel as claimed in claim 1, wherein the display device is configured to display a type of an excavated object.

10. An assist device for a shovel, the assist device being configured to assist work associated with loading of a transporter vehicle with an object by the shovel, the assist device comprising:
- a display device configured to display remaining time calculated on a transporter vehicle basis based on time required for the transporter vehicle to dump the object and return, the required time being estimated based on a difference between a time of completion of first loading of the transporter vehicle with the object by an attachment of the shovel and a time of a start of second loading of the transporter vehicle with the object by the attachment, the second loading being subsequent to the first loading,
- wherein the display device is further configured to display a predicted probability that is a numerical value representing how certain the remaining time is.

11. The assist device for the shovel as claimed in claim 10, wherein the display device is configured to display map information and position information of the shovel.

12. The assist device for the shovel as claimed in claim 10, wherein the display device is configured to display map information and busyness of each of loading sites.

13. The assist device for the shovel as claimed in claim 10, wherein the display device is configured to display arrival times of a plurality of transporter vehicles using a common time axis.

14. The shovel as claimed in claim 1, wherein the hardware processor is configured to record loading completion time based on the time of the completion of the first loading of the transporter vehicle and loading start time based on the time of the start of the second loading of the transporter vehicle, and to estimate the required time based on the recorded loading completion time and the recorded loading start time.

15. The assist device for the shovel as claimed in claim 10, wherein
- loading completion time based on the time of the completion of the first loading of the transporter vehicle and loading start time based on the time of the start of the second loading of the transporter vehicle are recorded by the shovel, and
- the required time is estimated based on the recorded loading completion time and the recorded loading start time.

16. The shovel as claimed in claim 1, wherein the hardware processor is configured to estimate, based on the difference, time from a time of completion of the second loading of the transporter vehicle to a time of a start of third loading of the transporter vehicle with the object by the attachment as the time required for the transporter vehicle to dump the object and return, the third loading being subsequent to the second loading.

17. The assist device for the shovel as claimed in claim 10, wherein time from a time of completion of the second loading of the transporter vehicle to a time of a start of third loading of the transporter vehicle with the object by the attachment is estimated, based on the difference, as the time required for the transporter vehicle to dump the object and return, the third loading being subsequent to the second loading.

18. The shovel as claimed in claim 1, wherein the display device is further configured to display a variation range of the remaining time.

19. The assist device as claimed in claim 10, wherein the display device is further configured to display a variation range of the remaining time.

20. A method of displaying information for a shovel, the shovel including a lower traveling body, an upper turning body turnably mounted on the lower traveling body, an attachment attached to the upper turning body and configured to perform loading of a transporter vehicle with an object, a hardware processor, and a display device, the method comprising:
- estimating, by the hardware processor, time required for the transporter vehicle to dump the object and return based on a difference between a time of completion of first loading of the transporter vehicle with the object by the attachment and a time of a start of second loading of the transporter vehicle with the object by the attachment, the second loading being subsequent to the first loading;
- displaying, by the display device, remaining time calculated based on the estimated required time on a transporter vehicle basis; and
- displaying, by the display device, a predicted probability that is a numerical value representing how certain the remaining time is.

* * * * *